(12) United States Patent
Shionozaki et al.

(10) Patent No.: US 10,133,966 B2
(45) Date of Patent: Nov. 20, 2018

(54) INFORMATION PROCESSING APPARATUS, INFORMATION PROCESSING METHOD, AND INFORMATION PROCESSING SYSTEM

(71) Applicant: SONY CORPORATION, Tokyo (JP)

(72) Inventors: Atsushi Shionozaki, Tokyo (JP); Hiroshi Goto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 24 days.

(21) Appl. No.: 15/026,074

(22) PCT Filed: Aug. 26, 2014

(86) PCT No.: PCT/JP2014/072267
§ 371 (c)(1),
(2) Date: Mar. 30, 2016

(87) PCT Pub. No.: WO2015/068447
PCT Pub. Date: May 14, 2015

(65) Prior Publication Data
US 2016/0217350 A1  Jul. 28, 2016

(30) Foreign Application Priority Data

Nov. 6, 2013  (JP) .................................. 2013-230387

(51) Int. Cl.
*G06K 9/00* (2006.01)
*G06K 9/78* (2006.01)
*G06F 17/30* (2006.01)
*H04N 1/00* (2006.01)
(Continued)

(52) U.S. Cl.
CPC ......... *G06K 9/78* (2013.01); *G06F 17/30047* (2013.01); *G06F 17/30247* (2013.01); *G06K 9/00671* (2013.01); *G06K 9/46* (2013.01); *G06T 7/70* (2017.01); *H04N 1/00* (2013.01);
(Continued)

(58) Field of Classification Search
None
See application file for complete search history.

(56) References Cited

U.S. PATENT DOCUMENTS 8,004,536 B2 *  8/2011  Wilensky ............ G06F 3/04842
345/589
2012/0092370 A1 *  4/2012  Oh ..................... G06Q 30/0207
345/633
(Continued)

FOREIGN PATENT DOCUMENTS

JP    2005-136841    5/2005
JP    2008-283502    11/2008
(Continued)

*Primary Examiner* — Hadi Akhavannik
(74) *Attorney, Agent, or Firm* — Paratus Law Group, PLLC

(57) ABSTRACT

To provide a technology capable of having another object related to one object easily recognized after detection of the one object, there is provided an information processing apparatus including a detection unit configured to detect a predetermined detection object, a data obtaining unit configured to obtain instruction information ordering that a predetermined imaging object according to the detection object fall within an imaging range of an imaging unit, and a display control unit configured to cause a display unit to display the instruction information.

16 Claims, 18 Drawing Sheets

(51) Int. Cl.
*G06K 9/46* (2006.01)
*G06T 7/70* (2017.01)
(52) U.S. Cl.
CPC ........... *G06T 2207/30204* (2013.01); *G06T 2207/30244* (2013.01)

(56) References Cited

U.S. PATENT DOCUMENTS

2012/0317510 A1* 12/2012 Noda .................. G06F 3/04815
  715/782
2013/0050500 A1* 2/2013 Makino .................. A63F 13/10
  348/169

FOREIGN PATENT DOCUMENTS

| | | |
|---|---|---|
| JP | 2012-169986 | 9/2012 |
| JP | 2013-080326 | 5/2013 |

* cited by examiner

INFORMATION PROCESSING APPARATUS, INFORMATION PROCESSING METHOD, AND INFORMATION PROCESSING SYSTEM

CROSS REFERENCE TO PRIOR APPLICATION

This application is a National Stage Patent Application of PCT International Patent Application No. PCT/JP2014/072267 (filed on Aug. 26, 2014) under 35 U.S.C. § 371, which claims priority to Japanese Patent Application No. 2013-230387 (filed on Nov. 6, 2013), which are all hereby incorporated by reference in their entirety.

TECHNICAL FIELD

The present disclosure relates to an information processing apparatus, an information processing method, and an information processing system.

BACKGROUND ART

In recent years, a technology of recognizing an object from a captured image to execute processing according to the recognized object has been known. For example, an augmented reality (AR) application for executing processing to cause a virtual object associated with the recognized object to be displayed is also known. A technology of causing information for guiding a user so that recognition of an object is facilitated to be displayed is also disclosed (see Patent Literature 1, for example).

CITATION LIST

Patent Literature

Patent Literature 1: JP 2013-080326A

SUMMARY OF INVENTION

Technical Problem

As described above, technologies for facilitating recognition of objects have been disclosed. On the other hand, if one object is related with another object, such a case can be assumed that the other object is desired to be recognized after detection of the one object, for example. Thus, a technology capable of having another object related to the one object easily recognized after detection of the one object is desirably provided.

Solution to Problem

According to the present disclosure, there is provided an information processing apparatus including: a detection unit configured to detect a predetermined detection object; a data obtaining unit configured to obtain instruction information ordering that a predetermined imaging object according to the detection object fall within an imaging range of an imaging unit; and a display control unit configured to cause a display unit to display the instruction information.

According to the present disclosure, there is provided an information processing method including: detecting a predetermined detection object; obtaining instruction information ordering that a predetermined imaging object according to the detection object fall within an imaging range of an imaging unit; and causing, by a processor, a display unit to display the instruction information.

According to the present disclosure, there is provided an information processing system including: an information provision apparatus including a detection object recognition unit configured to recognize a predetermined detection object; and an information processing apparatus including a detection unit configured to detect the detection object, a data obtaining unit configured to obtain instruction information ordering that a predetermined imaging object according to the detection object fall within an imaging range of an imaging unit, and a display control unit configured to cause a display unit to display the instruction information.

Advantageous Effects of Invention

According to the present disclosure, as described above, a technology capable of having another object related to one object easily recognized after detection of the one object is provided. The effect is not necessarily limiting but together with the effect or instead of the effect, any of effects illustrated in this Description or other effects that can be grasped from this Description may be exerted.

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Description will be made in the following order.
1. Example configuration of information processing system;
2. Example functional configuration of information processing apparatus;
3. Example functional configuration of information provision apparatus;
4. Functional details of information processing apparatus;
5. Hardware configuration examples of information processing apparatus;
6. Hardware configuration examples of information provision apparatus; and
7. Conclusion

1. EXAMPLE CONFIGURATION OF INFORMATION PROCESSING SYSTEM

Figure 1:
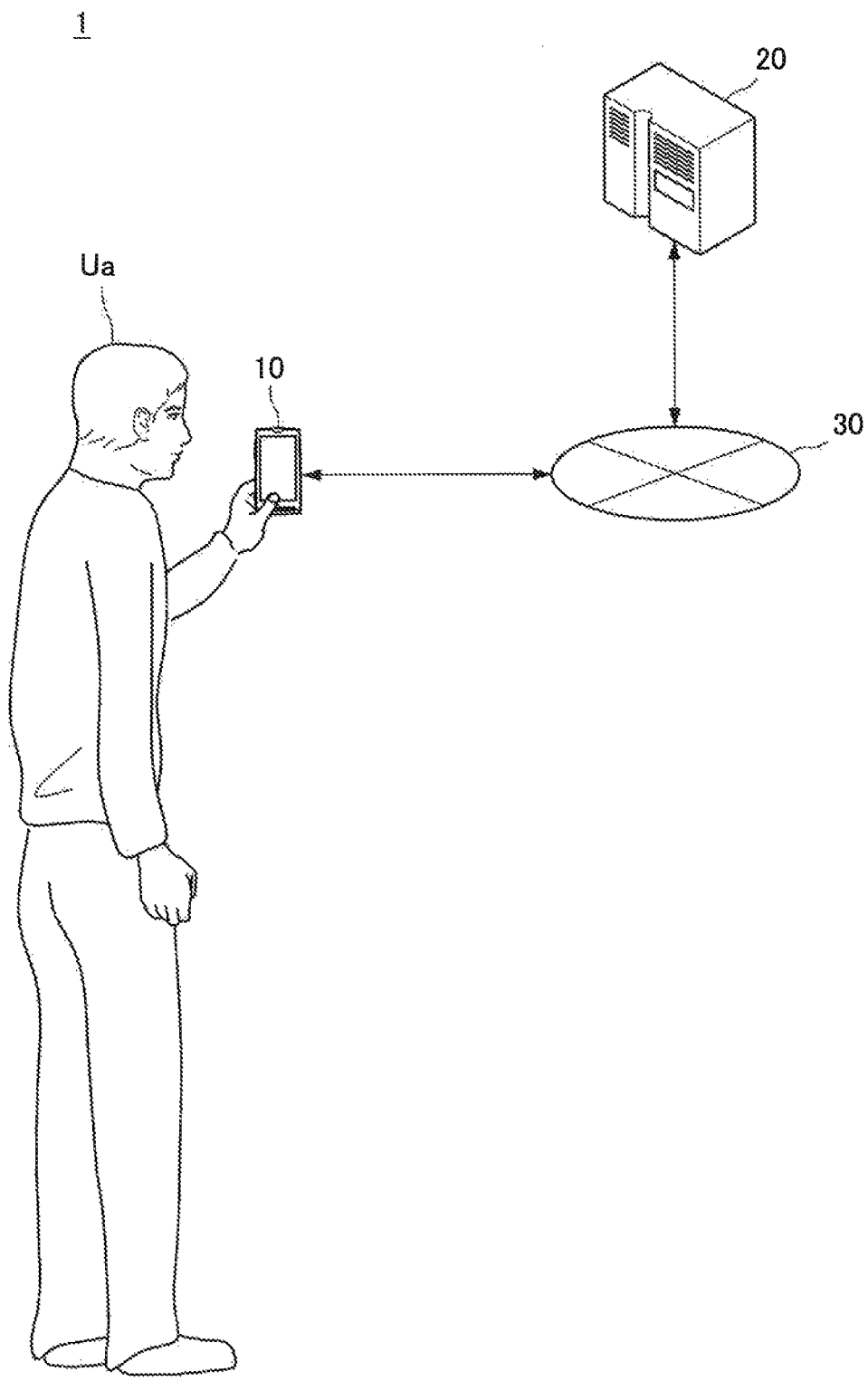
FIG. 1 is a view illustrating an example configuration of an information processing system according to an embodiment of this disclosure.

First, an example configuration of an information processing system according to an embodiment of this disclosure will be described. FIG. 1 is a view illustrating an example configuration of the information processing system according to the embodiment of this disclosure. By referring to FIG. 1, an information processing system 1 includes an information processing apparatus 10 and an information provision apparatus 20. The information processing apparatus 10 and the information provision apparatus 20 are capable of wired or wireless communication via a network 30. The information processing apparatus 10 is held by a user Ua.

In recent years, a technology of recognizing an object from a captured image to execute processing according to the recognized object has been known. For example, an AR application for executing processing to cause a virtual object associated with the recognized object to be displayed is also known. A technology of causing information for guiding the user Ua to be displayed so that recognition of an object is facilitated is also disclosed.

On the other hand, if one object is related with another object, such a case can be assumed that the other object is desired to be recognized after detection of the one object, for example. Thus, a technology capable of having the other object related to the one object easily recognized after detection of the one object is proposed in this Description.

In the description below, a case in which the information processing apparatus 10 is applied to a smartphone with a camera function is described as an example, but the information processing apparatus 10 may be applied to apparatuses other than the smartphone. For example, the information processing apparatus 10 may be applied to a video camera, a digital camera, personal digital assistants (PDA), a personal computer (PC), a mobile phone, a portable music reproducing device, a portable video processing device, a portable game device, a telescope, a binocular and the like.

The example configuration of the information processing system 1 according to the embodiment of this disclosure has been described above.

2. EXAMPLE FUNCTIONAL CONFIGURATION OF INFORMATION PROCESSING APPARATUS

Figure 2:
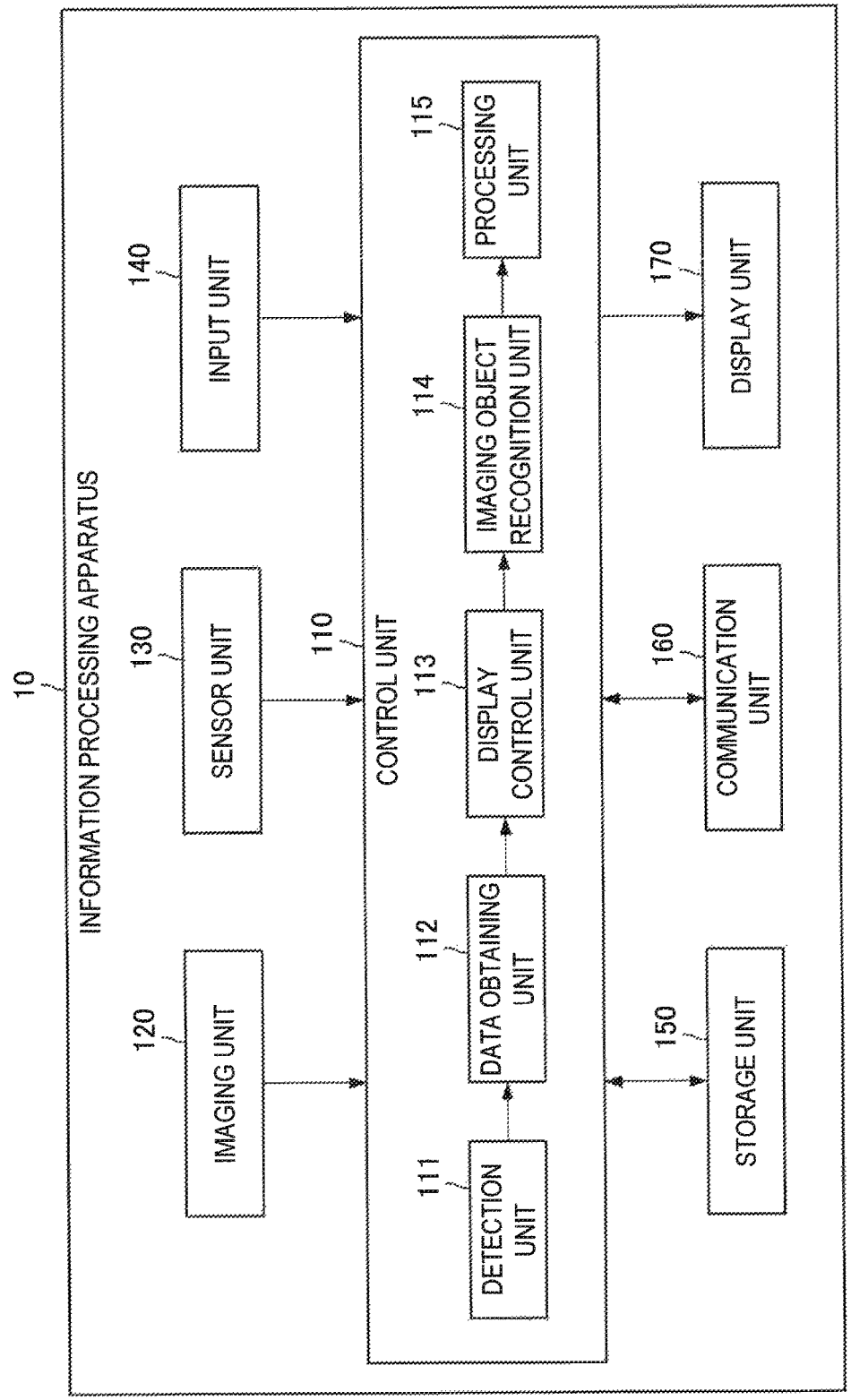
FIG. 2 is a view illustrating an example functional configuration of an information processing apparatus according to the embodiment.

Subsequently, an example functional configuration of the information processing apparatus 10 according to the embodiment of this disclosure will be described. FIG. 2 is a view illustrating the example functional configuration of the information processing apparatus 10 according to the embodiment of this disclosure. As illustrated in FIG. 2, the information processing apparatus 10 includes a control unit 110, an imaging unit 120, a sensor unit 130, an input unit 140, a storage unit 150, a communication unit 160, and a display unit 170.

The control unit 110 corresponds to a processor such as a central processing unit (CPU), for example. The control unit 110 exerts various functions that the control unit 110 has by executing programs stored in the storage unit 150 or other storage mediums. The control unit 110 has respective functional blocks such as a detection unit 111, a data obtaining unit 112, a display control unit 113, an imaging object recognition unit 114, and a processing unit 115. Functions of the respective functional blocks will be described later.

The imaging unit 120 is a camera module for capturing an image. The imaging unit 120 images a real space by using an imaging element such as a charge coupled device (CCD) or a complementary metal oxide semiconductor (CMOS) and generates an image. The image generated by the imaging unit 120 is output to the control unit 110. In the example illustrated in FIG. 2, the imaging unit 120 and the information processing apparatus 10 are integrated, but the imaging unit 120 may be configured separately from the information processing apparatus 10. For example, an imaging device connected in a wired or wireless manner with the information processing apparatus 10 may be treated as the imaging unit 120.

The sensor unit 130 obtains sensor data. For example, the sensor unit 130 includes a 3-axis acceleration sensor. The 3-axis acceleration sensor measures gravitational acceleration applied to the imaging unit 120 and generates sensor data (acceleration data) three-dimensionally indicating amplitude and direction of the gravitational acceleration. The sensor unit 130 may include a geomagnetic sensor. The geomagnetic sensor generates sensor data (geomagnetic data) indicating a direction of geomagnetism in a coordinate system of the imaging unit 120. Moreover, the sensor unit 130 may include a positioning sensor (a global positioning system (GPS), for example). The positioning sensor generates sensor data (positioning data) indicating a latitude and a longitude of the information processing apparatus 10 in the real space. Though the sensor unit 130 is integrated with the information processing apparatus 10 in the example illustrated in FIG. 2, the sensor unit 130 may be configured separately from the information processing apparatus 10.

The input unit 140 detects an operation by the user and outputs it to the control unit 110. In this Description, since a case in which the input unit 140 is constituted by a touch panel is assumed, the operation by the user corresponds to an operation of tapping on the touch panel. However, the input unit 140 may be constituted by hardware (such as a button, for example) other than the touch panel. In the example illustrated in FIG. 2, the input unit 140 is integrated with the information processing apparatus 10 but the input unit 140 may be configured separately from the information processing apparatus 10.

The storage unit 150 stores programs for operating the control unit 110, by using a storage medium such as a semiconductor memory or a hard disk. Further, for example, the storage unit 150 can store various types of data used by the programs. Note that, in the example shown in FIG. 2, while the storage unit 150 is integrated with the information processing apparatus 10, the storage unit 150 may be constituted in a separate body to the information processing apparatus 10.

It is possible for the communication unit 160 to perform communication with another apparatus (for example, the information provision apparatus 20 or the like). In the case where communication is performed with the information provision apparatus 20, for example, it is possible for the communication unit 160 to perform communication via the network 30. The form of the communication by the communication unit 160 is not particularly limited, and the communication by the communication unit 160 may be communication by wireless, or may be communication by wires. Note that, in the example shown in FIG. 2, while the communication unit 160 is integrated with the information processing apparatus 10, the communication unit 160 may be constituted in a separate body to the information processing apparatus 10.

The display unit 170 displays various types of information in accordance with control by the display control unit 113. The display unit 170 is constituted by a liquid crystal display (LCD), an organic electroluminescence (EL) display device and the like, for example. In the example illustrated in FIG. 2, the display unit 170 is integrated with the information processing apparatus 10 but the display unit 170 may be configured separately from the information processing apparatus 10. For example, the display device connected in a wired or wireless manner with the information processing apparatus 10 may be treated as the display unit 170.

The example functional configuration of the information processing apparatus 10 according to the embodiment of this disclosure has been described above.

3. EXAMPLE FUNCTIONAL CONFIGURATION OF INFORMATION PROVISION APPARATUS

Figure 3:
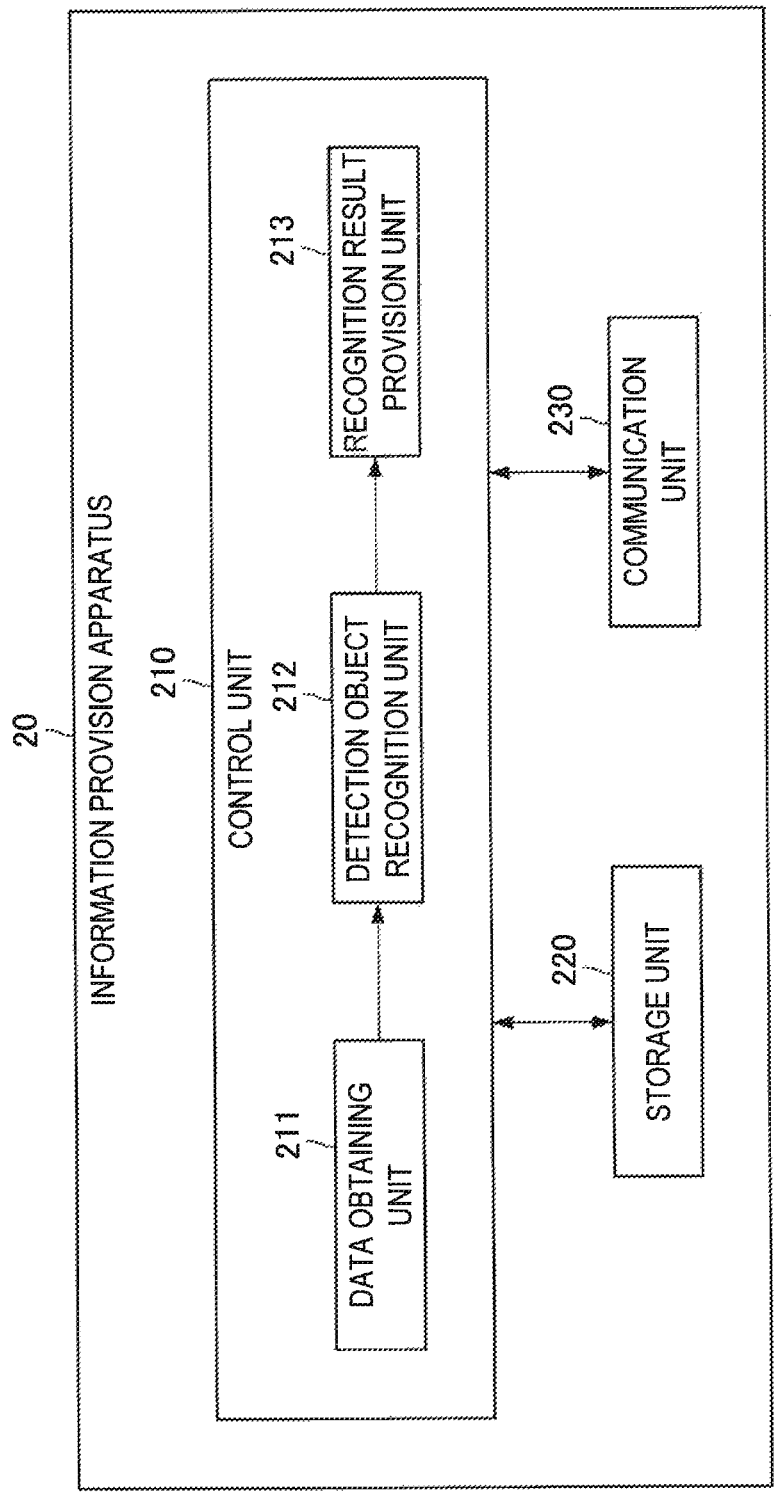
FIG. 3 is a view illustrating the example functional configuration of an information provision apparatus according to the embodiment.

Subsequently, an example functional configuration of the information provision apparatus 20 according to the embodiment of this disclosure will be described. FIG. 3 is a view illustrating the example functional configuration of the information provision apparatus 20 according to the embodiment of this disclosure. As illustrated in FIG. 3, the information provision apparatus 20 includes a control unit 210, a storage unit 220, and a communication unit 230.

The control unit 210 corresponds to a processor such as a central processing unit (CPU), for example. The control unit 210 exerts various functions that the control unit 210 has by executing programs stored in the storage unit 220 or other storage mediums. The control unit 210 has respective functional blocks such as a data obtaining unit 211, a detection object recognition unit 212, and a recognition result provision unit 213. Functions of the respective functional blocks will be described later.

The storage unit 220 stores programs for operating the control unit 210, by using a storage medium such as a semiconductor memory or a hard disk. Further, for example, the storage unit 220 can store various types of data used by the programs. Note that, in the example shown in FIG. 3, while the storage unit 220 is integrated with the information provision apparatus 20, the storage unit 220 may be constituted in a separate body to the information provision apparatus 20.

It is possible for the communication unit 230 to perform communication with another apparatus (for example, the information processing apparatus 10 or the like). In the case where communication is performed with the information processing apparatus 10, for example, it is possible for the communication unit 230 to perform communication via the network 30. The form of the communication by the communication unit 230 is not particularly limited, and the communication by the communication unit 230 may be communication by wireless, or may be communication by wires. Note that, in the example shown in FIG. 3, while the communication unit 230 is integrated with the information provision apparatus 20, the communication unit 230 may be constituted in a separate body to the information provision apparatus 20.

The example functional configuration of the information provision apparatus 20 according to the embodiment of this disclosure has been described above.

4. FUNCTIONAL DETAILS OF INFORMATION PROCESSING APPARATUS

Subsequently, functional details of the information processing apparatus 10 according to the embodiment of this disclosure will be described. First, one object (hereinafter referred to also as a "detection object") is detected by the detection unit 111 of the information processing apparatus 10. Here, a type of the detection object detected by the detection unit 111 is not particularly limited. For example, the detection object may be an object recognized from a captured image captured by the imaging unit 120.

The object recognized from the captured image may be a marker prepared for recognition or an object other than the marker. Moreover, the detection object may be position information of the user Ua holding the imaging unit 120. Furthermore, the detection object may be a combination of the object recognized from the captured image and the position information of the user Ua.

Figure 4:
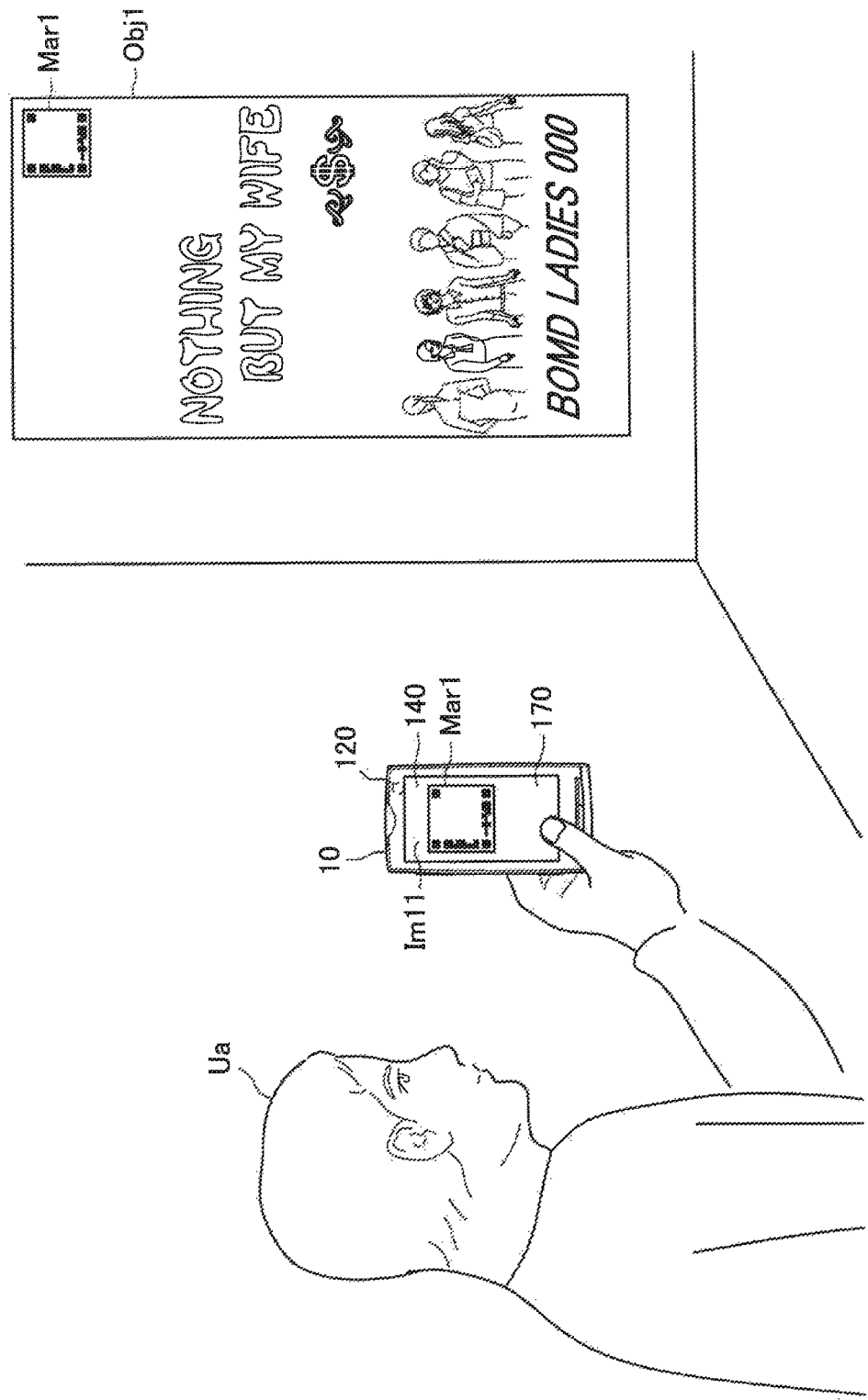
FIG. 4 is a view for explaining an example in which a marker is recognized as a detection object.

First, a case using a marker recognized as a detection object from the captured image will be described. FIG. 4 is a view for explaining the example in which the marker is recognized as the detection object. As illustrated in FIG. 4, a marker Mar1 is present in a real space. FIG. 4 illustrates the example in which the marker Mar1 is added to an object Obj1 but a position where the marker Mar1 is present is not particularly limited.

Moreover, FIG. 4 illustrates the case using an advertisement medium of a movie as an example of the object Obj1, but a type of the object Obj1 is not particularly limited, either. The display control unit 113 causes the display unit 170 to display the captured image, and the detection unit 111 provides the captured image to the information provision apparatus 20. In the information provision apparatus 20, the data obtaining unit 211 obtains the captured image provided from the information processing apparatus 10, and the detection object recognition unit 212 tries to recognize the marker from the captured image. The recognition result provision unit 213 provides a recognition result of the marker to the information processing apparatus 10. Recognition of the marker may be performed by the information processing apparatus 10 instead of the information provision apparatus 20.

In the example illustrated in FIG. 4, the display control unit 113 causes the display unit 170 to display, as a screen Im11, the captured image showing the marker Mar1. If the marker Mar1 is recognized from the captured image, the detection unit 111 detects the marker Mar1 indicated by the recognition result of the marker as the detection object. When the detection object is detected, the control unit 110 may cause an operation mode to transition from a first mode in which the detection object is recognized to a second mode in which an object (hereinafter referred also as an "imaging object") according to the detection object is recognized.

Figure 5:
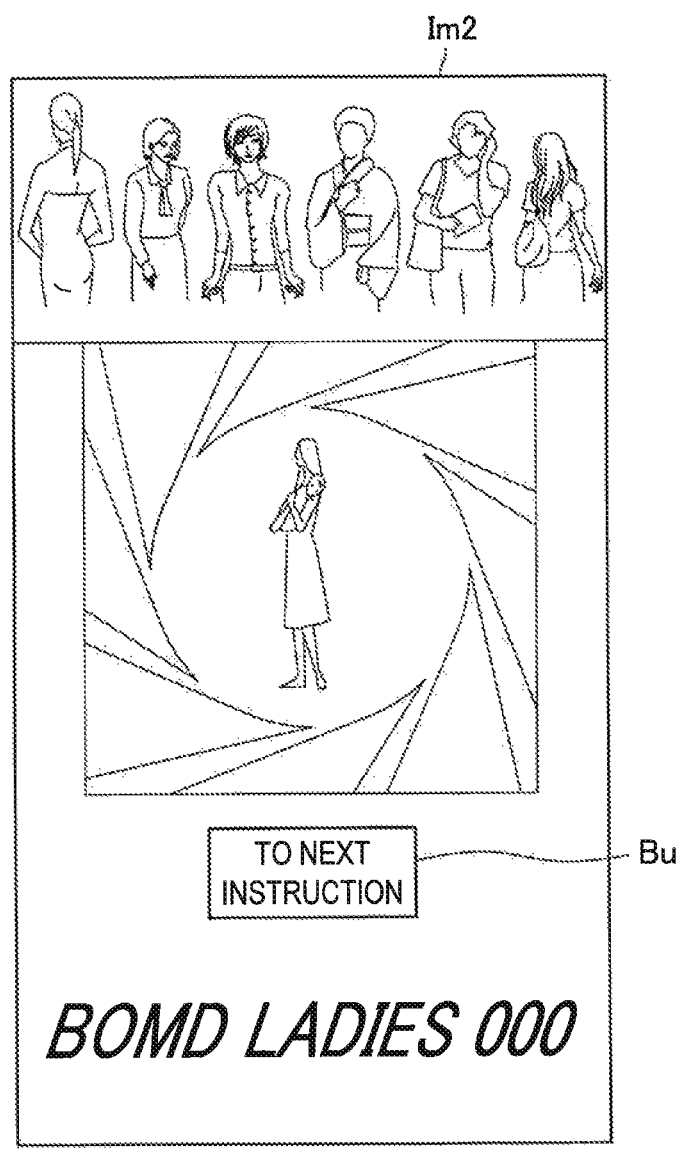
FIG. 5 is a view illustrating an example display of a message that an operation mode is caused to transition from a first mode in which the detection object is recognized to a second mode in which an imaging object is recognized.

At this time, in order for the user Ua to be able to intuitively grasp the transition of the operation mode, the display control unit 113 may display a message that the operation mode is caused to transition from the first mode to the second mode on the display unit 170. FIG. 5 is a view illustrating an example display that the operation mode is caused to transition from the first mode in which the detection object is recognized to the second mode in which the imaging object is recognized. As illustrated in FIG. 5, a screen Im2 indicating the message that the operation mode is caused to transition from the first mode to the second mode may be displayed on the display unit 170. For example, a button Bu is arranged on the screen Im2, and the operation mode may be caused to transition to the second mode when an operation of pressing down the button Bu is input from the user Ua.

Figure 6:
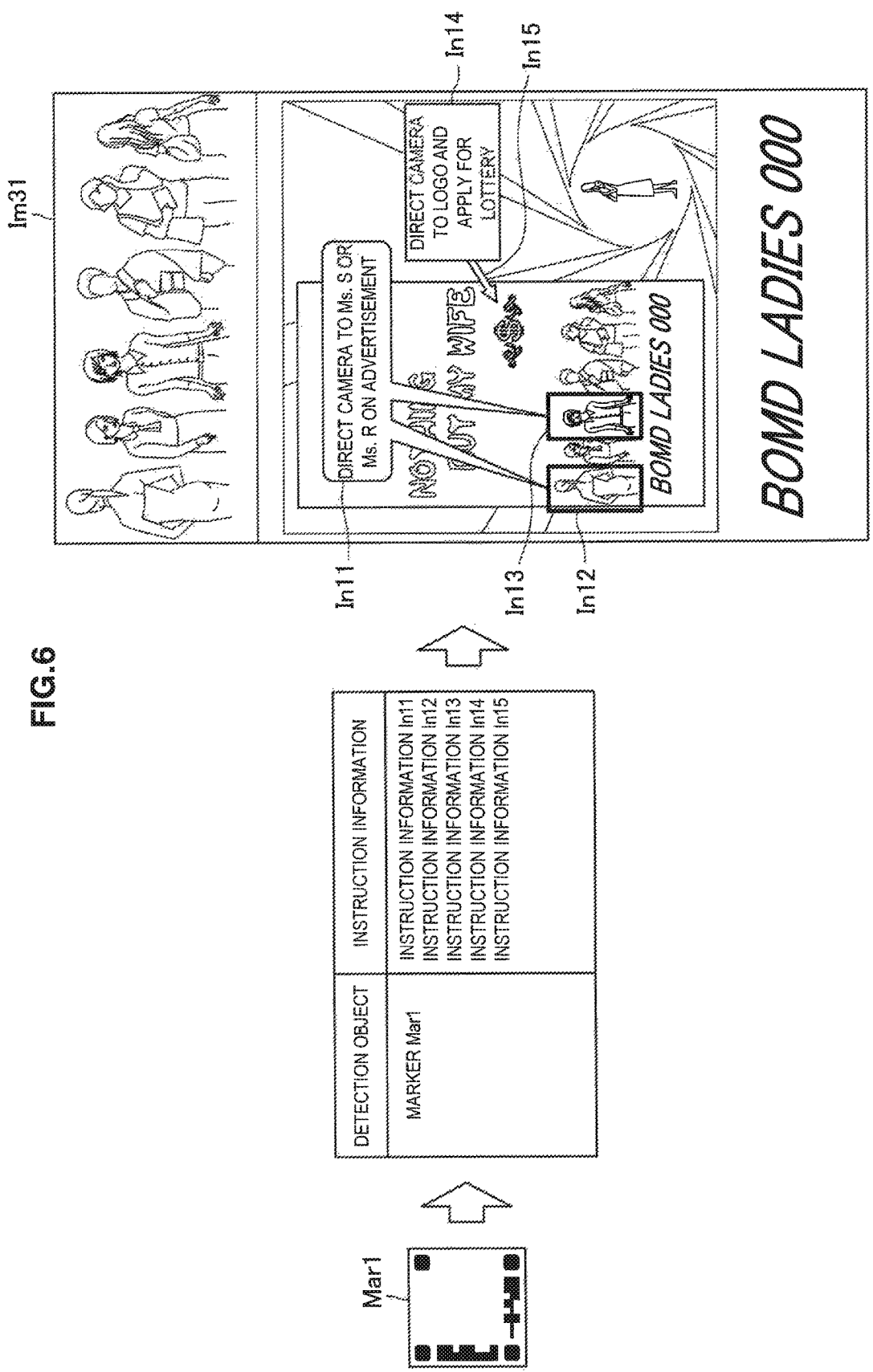
FIG. 6 is a view illustrating an example display of instruction information according to the marker.

Subsequently, the data obtaining unit 112 obtains instruction information ordering that the imaging object according to the marker Mar1 as the example of the detection object fall within an imaging range of the imaging unit 120, and the display control unit 113 causes the display unit 170 to display the instruction information obtained by the data obtaining unit 112. FIG. 6 is a view illustrating an example display of the instruction information according to the marker Mar1. As illustrated in FIG. 6, the marker Mar1 and instruction information In11 to In15 are associated with each other. Here, the number of pieces of the instruction information associated with the marker Mar1 is five, but the number is not particularly limited.

In the example illustrated in FIG. 6, the data obtaining unit 112 obtains the instruction information In11 to In15 associated with the marker Mar1, and the display control unit 113 causes the display unit 170 to display a screen Im31 containing the instruction information In11 to In15 obtained by the data obtaining unit 112. Here, the case is assumed in which a display position of each of the instruction information In11 to In15 is determined, and the display control unit 113 superposes the instruction information In11 to In15 on a window in accordance with the respective display positions, but they may be superposed on a captured image.

When the display control unit 113 superposes the instruction information In11 to In15 on the captured image, the detection object recognition unit 212 preferably recognizes a three-dimensional position and posture of the marker Mar1, too. Then, the display control unit 113 preferably adjusts the positions and postures of the instruction information In11 to In15 in accordance with the three-dimensional position and posture of the marker Mar1 and superposes the instruction information In11 to In15 on the captured image. Then, the instruction information In11 to In15 adapted to the captured image can be provided to the user Ua.

By referring to FIG. 6, the instruction information In11 is illustrated as text data ordering that Ms. S or Ms. R present on the object Obj1 fall within the imaging range of the imaging unit 120. Moreover, the instruction information In12 is illustrated as a rectangular frame surrounding Ms. S present on the screen Im31. Moreover, the instruction information In13 is illustrated as a rectangular frame surrounding Ms. R present on the screen Im31. The instruction information In14 is illustrated as text data ordering that a logo present on the object Obj1 fall within the imaging range of the imaging unit 120. The instruction information In15 is illustrated as an arrow indicating the logo present on the screen Im31.

Figure 7:
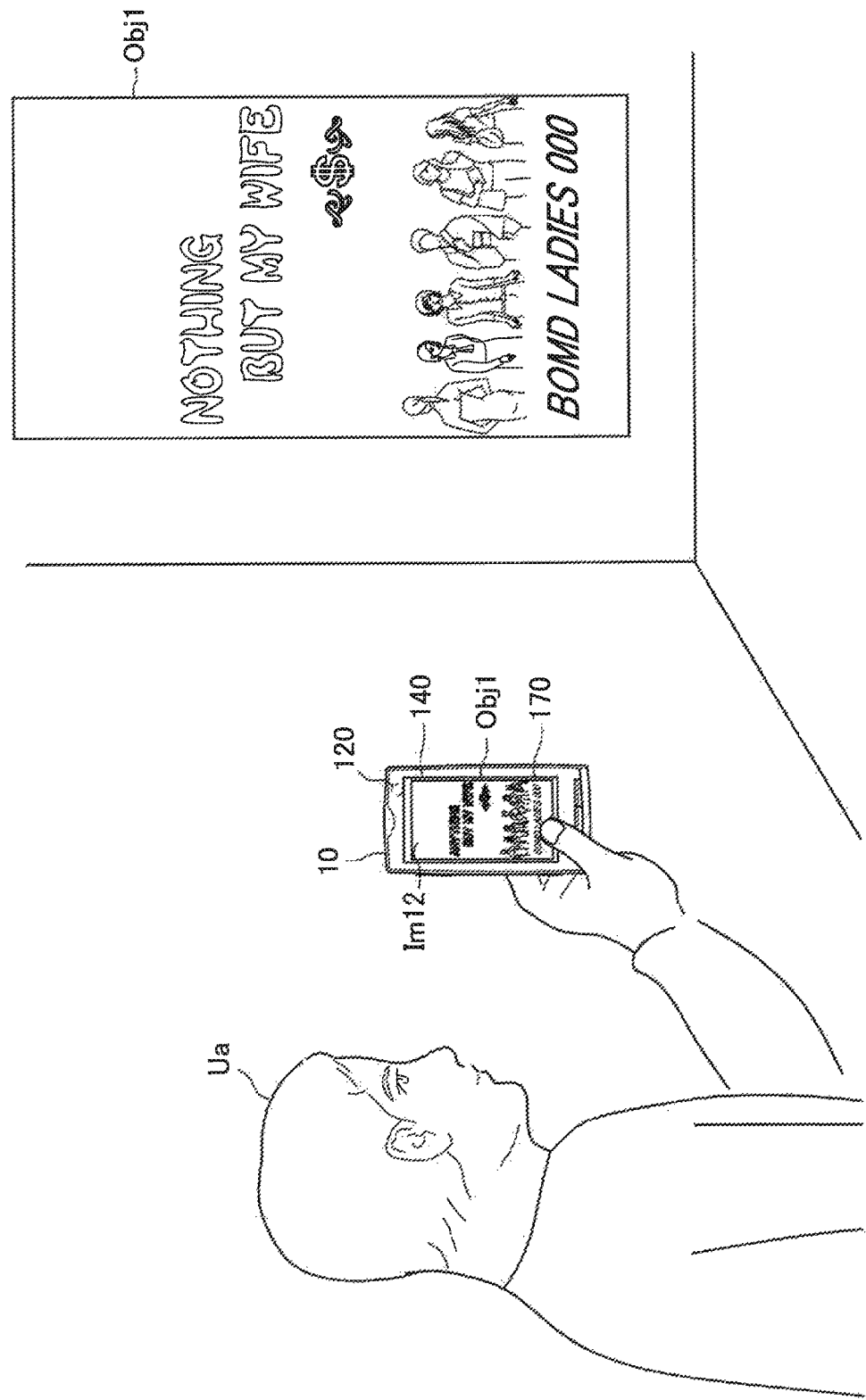
FIG. 7 is a view for explaining an example in which an object other than the marker is recognized as a detection object.

Subsequently, a case using an object other than the marker as the detection object will be described. FIG. 7 is a view for explaining an example in which the object other than the marker is recognized as the detection object. As illustrated in FIG. 7, the object Obj1 is present in the real space. The display control unit 113 causes the display unit 170 to display the captured image, and the detection unit 111 provides the captured image to the information provision apparatus 20.

In the information provision apparatus 20, the data obtaining unit 211 obtains the captured image provided from the information processing apparatus 10, and the detection object recognition unit 212 tries to recognize the object from the captured image. The recognition result provision unit 213 provides the recognition result of the object to the information processing apparatus 10. Similarly to the recognition of the marker, recognition of the object may be performed by the information processing apparatus 10 instead of the information provision apparatus 20.

In the example illustrated in FIG. 7, the captured image showing the object Obj1 is displayed as a screen Im12 on the display unit 170. If the object Obj1 is recognized from the captured image, the detection unit 111 detects the object Obj1 indicated by the recognition result of the object as the detection object. When the object Obj1 is detected, the control unit 110 may cause the operation mode to transition from the first mode in which the detection object is recognized to the second mode in which the imaging object according to the object Obj1 is recognized.

At this time, similarly to the case using the marker as the detection object, in order for the user Ua to be able to intuitively grasp the transition of the operation mode, the display control unit 113 may display a message that the operation mode is caused to transition from the first mode to the second mode on the display unit 170.

Figure 8:
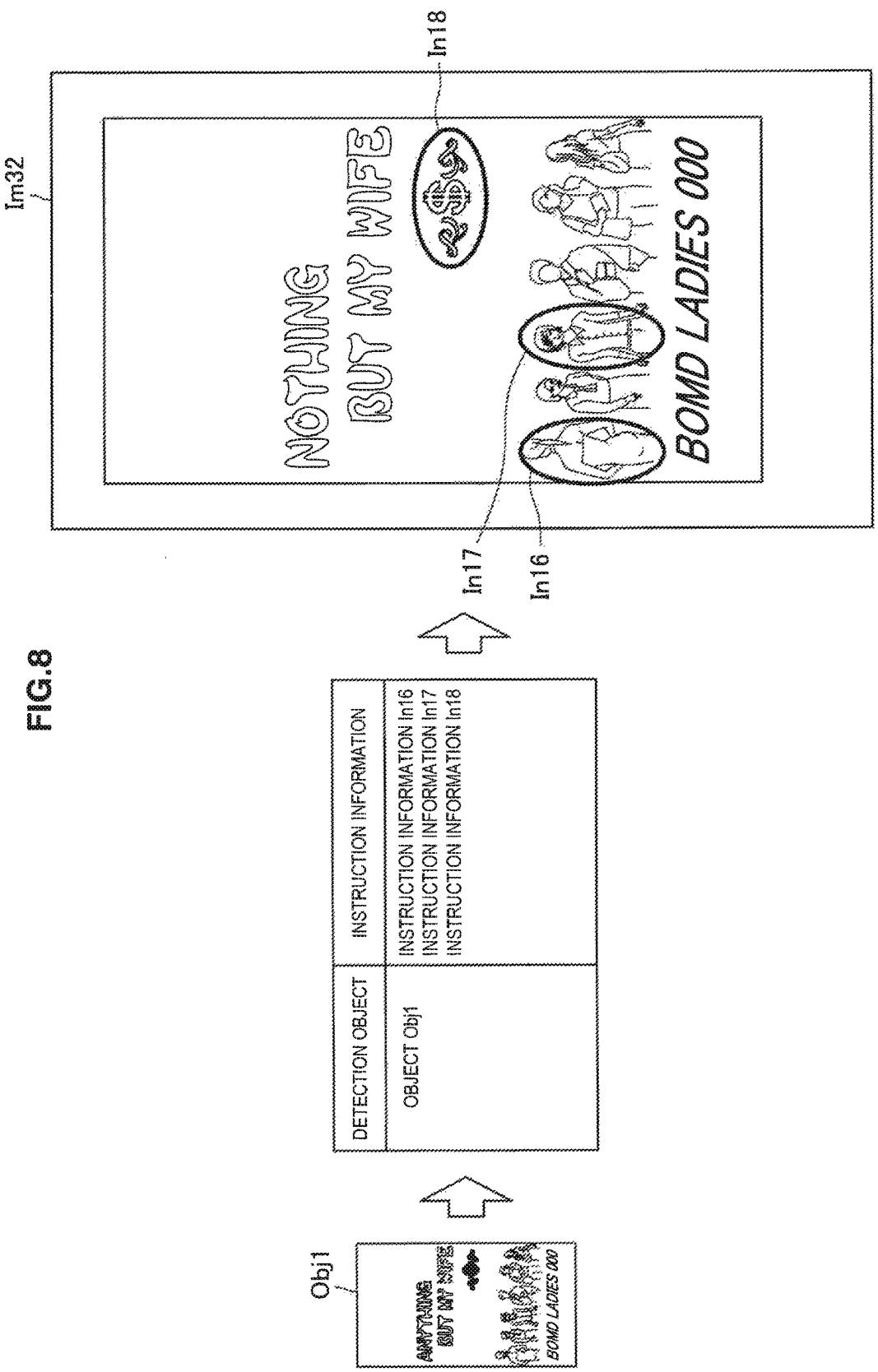
FIG. 8 is a view illustrating an example display of the instruction information according to the object other than the marker.

Subsequently, the data obtaining unit 112 obtains the instruction information ordering that the imaging object according to the object Obj1 as the example of the detection object fall within the imaging range of the imaging unit 120, and the display control unit 113 causes the display unit 170 to display the instruction information obtained by the data obtaining unit 112. FIG. 8 is a view illustrating an example display of the instruction information according to the object other than the marker. As illustrated in FIG. 8, the object Obj1 and instruction information In16 to In8 are associated with each other. Here, the number of pieces of the instruction information associated with the object Obj1 is three, but it is not particularly limited.

In the example illustrated in FIG. 8, the data obtaining unit 112 obtains the instruction information In16 to In18 associated with the object Obj1, and the display control unit 113 causes the display unit 170 to display a screen Im32 containing the instruction information In16 to In18 obtained by the data obtaining unit 112.

Here, the display control unit 113 superposes the instruction information In16 to In18 on the captured image. In more detail, the detection object recognition unit 212 also recognizes the three-dimensional position and posture of the object Obj1, and the display control unit 113 adjusts the positions and postures of the instruction information In16 to In18 and superposes the instruction information In16 to In18 on the captured image in accordance with the three-dimensional position and posture of the object Obj1. With such a configuration, the instruction information In16 to In18 adapted to the captured image can be provided to the user Ua.

However, as described above, the respective display positions of the instruction information In16 to In18 are determined, and the display control unit 113 may superpose the instruction information In16 to In18 on a window in accordance with the respective display positions.

By referring to FIG. 8, the instruction information In16 is illustrated as an elliptic frame surrounding Ms. S present on the screen Im32. Moreover, the instruction information In17 is illustrated as an elliptic frame surrounding Ms. R present on the screen Im32. The instruction information In18 is illustrated as an elliptic frame surrounding the logo present on the screen Im32.

The user Ua having viewed the instruction information displayed as above is considered to try to cause the imaging object to fall within the imaging range of the imaging unit 120 in accordance with the instruction information. After that, the captured image is captured by the imaging unit 120, and recognition of the imaging object according to the detection object from the captured image is tried by the imaging object recognition unit 114. The case in which the imaging object is recognized on the basis of the captured image will be described below. The recognition unit of the imaging object may be performed by a predetermined server (the information provision apparatus 20, for example) instead of the information processing apparatus 10.

Figure 9:
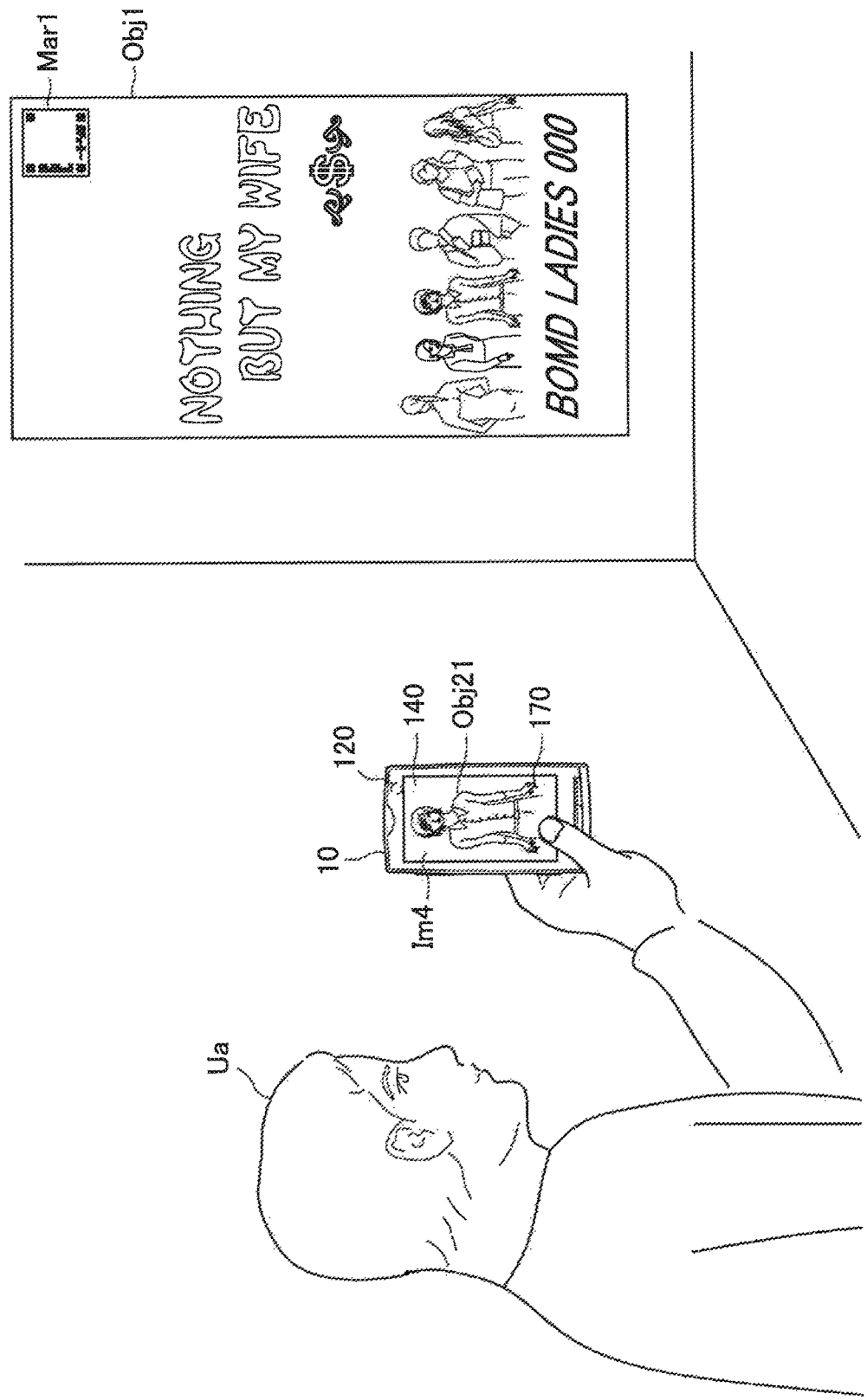
FIG. 9 is a view for explaining an example in which an imaging object made to fall within an imaging range in accordance with the instruction information is recognized.

FIG. 9 is a view for explaining an example in which the imaging object made to fall within the imaging range in accordance with the instruction information is recognized. If the user Ua having viewed the instruction information causes Ms. R present in the object Obj1 to fall within the imaging range of the imaging unit 120 in accordance with the instruction information In11 or the instruction information In13 as illustrated in FIG. 9, the display control unit 113 causes the display unit 170 to display, as a screen Im4, the captured image showing Ms. R present in the object Obj1.

Moreover, in the example illustrated in FIG. 9, Ms. R (object Obj21) is recognized as an imaging object from the captured image by the imaging object recognition unit 114. Particularly, it is preferable that in the first mode, the marker is recognized as the detection object, while in the second mode, the object other than the marker is recognized as the imaging object. Since it is estimated that recognition of the marker has a smaller processing load than recognition of the object other than the marker, such switching of modes is expected to be able to reduce the processing load efficiently.

Figure 10:
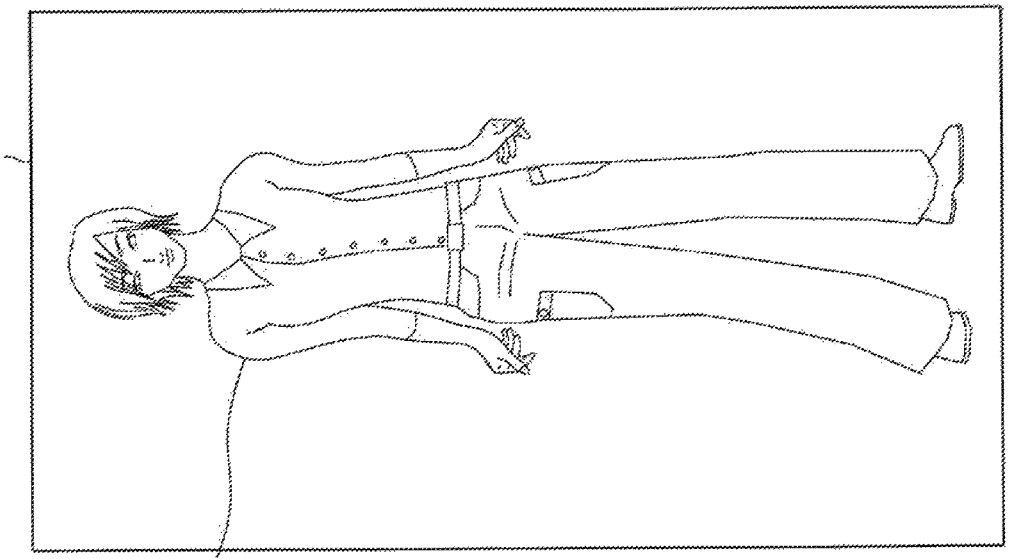
FIG. 10 is a view for explaining an execution example of processing according to the imaging object.

When the imaging object is recognized from the captured image, the processing unit 115 executes processing according to the imaging object. Execution of the processing according to the imaging object will be described below. FIG. 10 is a view for explaining an execution example of the processing according to the imaging object.

As illustrated in FIG. 10, the imaging object and the processing are associated with each other. In more detail, "Ms. S" as an example of the imaging object is associated with "display of virtual object V1" as an example of the processing, and "Ms. R" as an example of the imaging object is associated with "display of virtual object V2" as an example of the processing. A "logo" as an example of the imaging object is associated with "display of lottery page" as an example of the processing.

In the example illustrated in FIG. 10, the processing unit 115 selects the "display of virtual object V2" which is the processing associated with "Ms. R" which is the imaging object recognized from the captured image and causes the display unit 170 to display a screen Im5 containing the virtual object V2.

Here, the processing unit 115 superposes the virtual object V2 on the captured image. In more detail, the imaging object recognition unit 114 also recognizes the three-dimensional position and posture of the imaging object, and the processing unit 115 superposes the virtual object V2 on the captured image by adjusting the position and the posture of the virtual object V2 in accordance with the three-dimensional position and posture of the imaging object. With such a configuration, the instruction information In16 to In18 adapted to the captured image can be provided to the user Ua.

The imaging object is recognized from the captured image by the imaging object recognition unit 114, and in more detail, the imaging object can be recognized from the captured image on the basis of collation between a feature amount extracted from the captured image and dictionary data of the imaging object. Here, timing when the dictionary data of the imaging object is obtained by the data obtaining unit 112 is not limited, but it is desirably obtained after the imaging object according to the detection object is determined. Then, while a processing load for obtaining the dictionary data is suppressed, a storage capacity of the dictionary data which should be ensured in the information processing apparatus 10 can be also suppressed. The dictionary data may be obtained from a predetermined server (the information provision apparatus 20, for example), for example.

The example in which, if the imaging object is recognized on the basis of the captured image, processing to cause the display unit 170 to display the virtual object is executed by the processing unit 115 is illustrated, but timing when the virtual object is obtained is not limited. However, it is desirably obtained by the data obtaining unit 112 together with obtaining of the dictionary data. Then, while a processing load for obtaining the virtual object is suppressed, a storage capacity of the virtual object which should be ensured in the information processing apparatus 10 can be also suppressed. The virtual object may be obtained from the same server as the server providing the dictionary data, for example.

Figure 11:
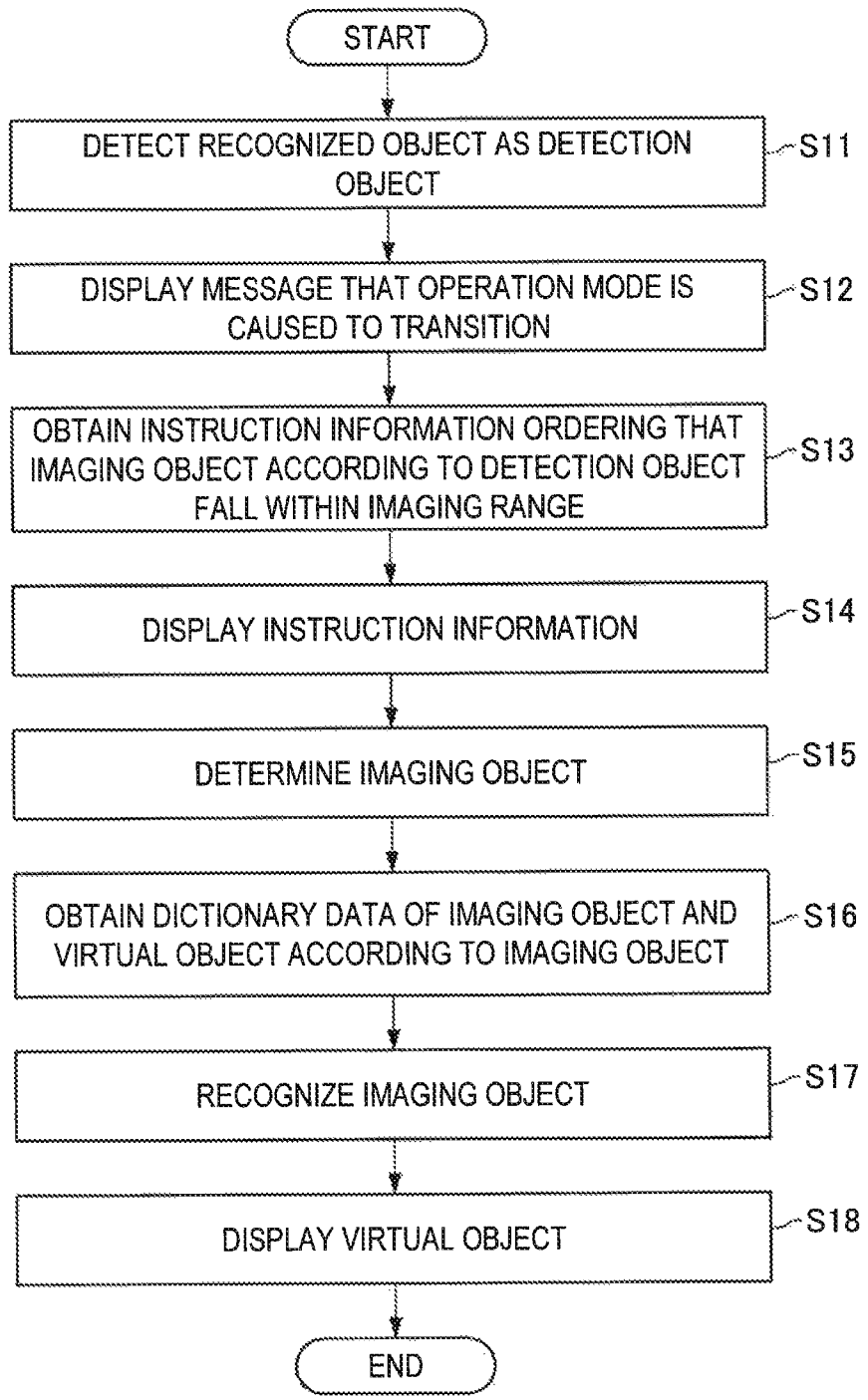
FIG. 11 is a flowchart illustrating an example operation of the information processing apparatus when an object is recognized as the detection object and when display of a virtual object is executed as processing according to the imaging object.

Subsequently, an example operation of the information processing apparatus 10 will be described. FIG. 11 is a flowchart illustrating the example operation of the information processing apparatus 10 when an object is recognized as a detection object and when display of the virtual object is executed as the processing according to the imaging object. The example operation illustrated in FIG. 11 is only an example of the operation of the information processing apparatus 10 and it is needless to say that the operation of the information processing apparatus 10 is not limited to the example operation illustrated in FIG. 11.

First, in the information processing apparatus 10, the detection unit 111 detects, as a detection object, an object recognized from the captured image captured by the imaging unit 120 (S11). At this time, the display control unit 113 may display, on the display unit 170, a message that the operation mode is caused to transition from the first mode in which the detection object is recognized to the second mode in which the imaging object according to the marker is recognized (S12). Then, the data obtaining unit 112 obtains the instruction information ordering that the imaging object according to the detection object fall within the imaging range of the imaging unit 120 (813).

Subsequently, the display control unit 113 causes the display unit 170 to display the instruction information obtained by the data obtaining unit 112 (S14). When the display control unit 113 determines the imaging object according to the detection object (S15), the data obtaining unit 112 obtains the dictionary data of the determined imaging object and the virtual object according to the imaging object (S16). When the imaging object recognition unit 114 recognizes the imaging object from the captured image (S17), the processing unit 115 causes the display unit 170 to display the virtual object obtained by the data obtaining unit 112 (S18).

The example operation of the information processing apparatus 10 when the object is recognized as the detection object and when display of the virtual object is executed as the processing according to the imaging object is described above. However, the processing executed by the processing unit 115 is not limited to the display of the virtual object. For example, the processing executed by the processing unit 115 may be evaluation of the imaging object. In the following, a case in which the processing executed by the processing unit 115 is evaluation of the imaging object will be described.

Figure 12:
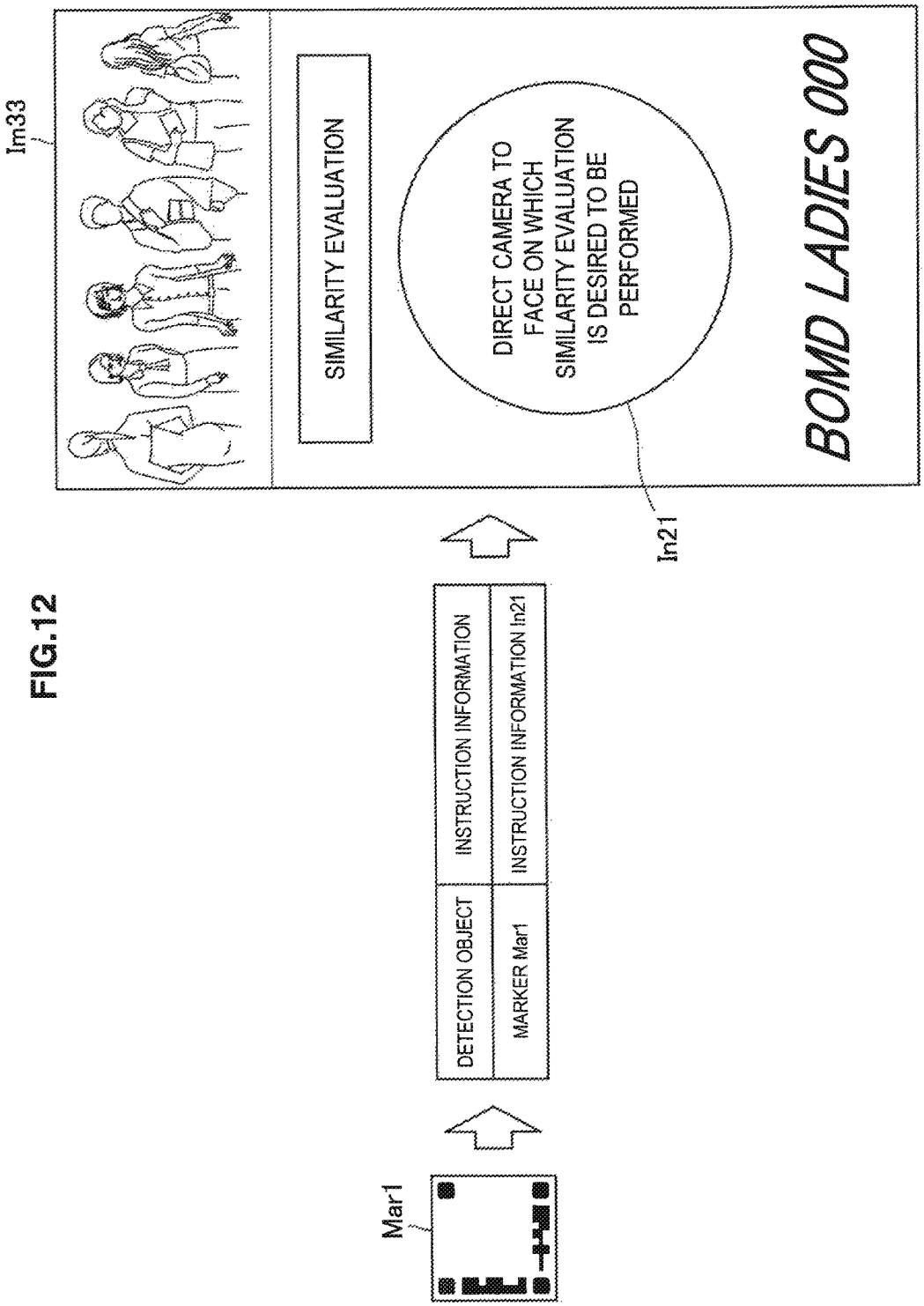
FIG. 12 is a view illustrating an example display of the instruction information when evaluation of the imaging object is executed as processing according to the imaging object.

FIG. 12 is a view illustrating an example display of the instruction information when evaluation of the imaging object is executed as the processing according to the imaging object. As illustrated in FIG. 12, the marker Mar1 is associated with instruction information In21. Here, the number of pieces of instruction information associated with the marker Mar1 is one but it is not particularly limited.

In the example illustrated in FIG. 12, the data obtaining unit 112 obtains the instruction information In21 associated with the marker Mar1, and the display control unit 113 causes the display unit 170 to display a screen Im33 containing the instruction information In21 obtained by the data obtaining unit 112. Here, such a case is assumed that a display position of the instruction information In21 is determined, and the display control unit 113 superposes the instruction information In21 on a window in accordance with the display position, but the instruction information In21 may be superposed on the captured image.

If the display control unit 113 superposes the instruction information In21 on the captured image, the detection object recognition unit 212 desirably recognizes the three-dimensional position and posture of the marker Mar1, too. Then, the display control unit 113 desirably superposes the instruction information In21 on the captured image by adjusting the position and the posture of the instruction information In21 in accordance with the three-dimensional position and posture of the marker Mar1. Then, the instruction information In21 adapted to the captured image can be provided to the user Ua.

By referring to FIG. 12, the instruction information In21 is illustrated as text data ordering that the imaging object to be evaluated fall within the imaging range of the imaging unit 120. In more detail, the instruction information In21 is illustrated as the text data ordering that a face for which similarity to evaluation data prepared in advance is desired to be evaluated fall within the imaging range of the imaging unit 120. However, the evaluation of the imaging object is not limited to the evaluation of similarity between the imaging object and the evaluation data.

For example, if the user Ua having viewed the instruction information causes the face desired to be evaluated to fall within the imaging range of the imaging unit 120 in accordance with the instruction information In21, the face is recognized from the captured image by the imaging object recognition unit 114. The processing unit 115 selects evaluation of the imaging object which is the processing associated with the face which is the imaging object recognized from the captured image and executes evaluation of the imaging object.

Timing when the evaluation data is obtained is not limited. However, similarly to the above, it is desirably obtained by the data obtaining unit 112 together with obtaining of the dictionary data. Then, while a processing load for obtaining the evaluation data is suppressed, a storage capacity of the evaluation data which should be ensured in the information processing apparatus 10 can be also suppressed. The evaluation data may be obtained from the same server as the server providing the dictionary data, for example.

Figure 13:
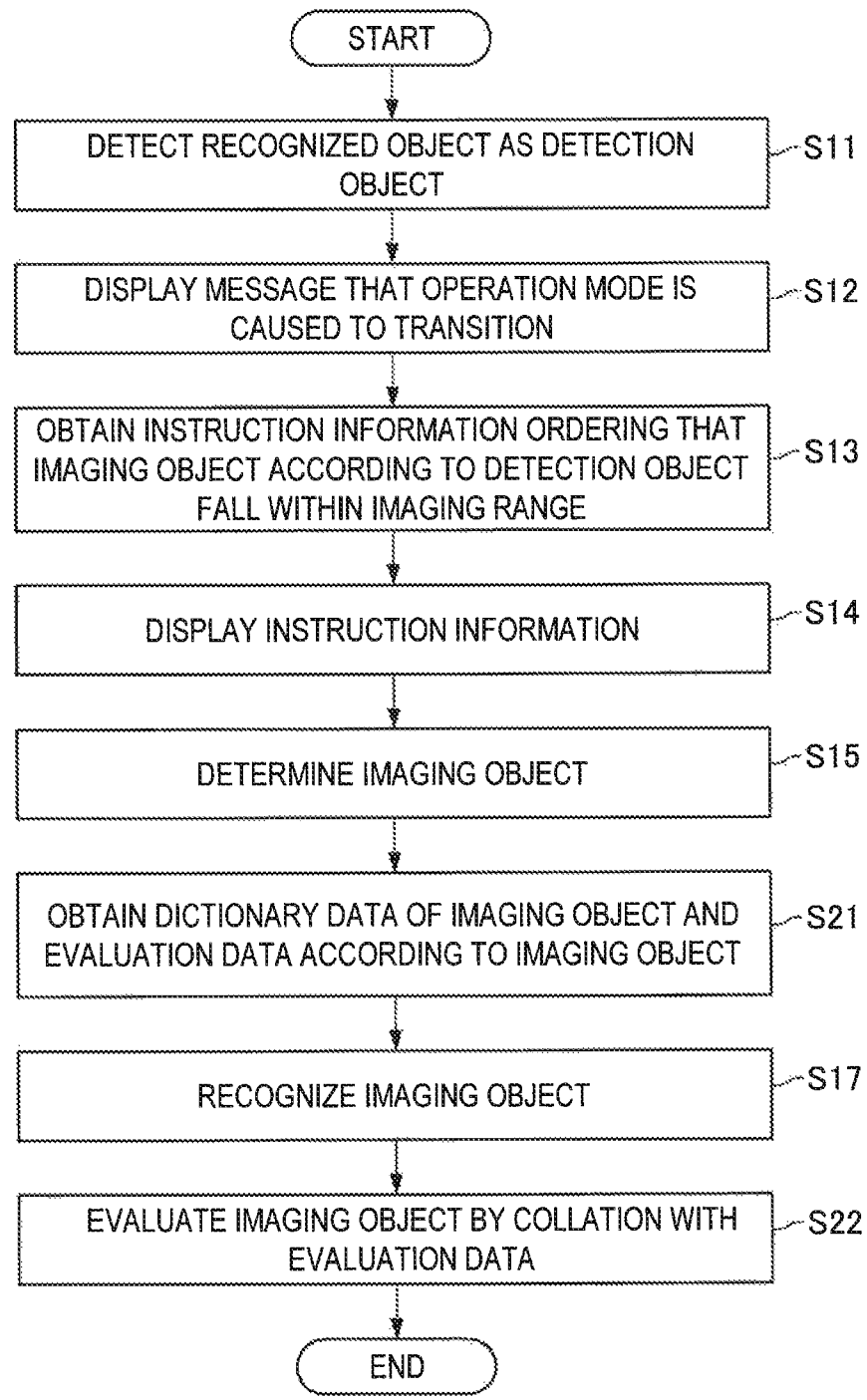
FIG. 13 is a flowchart illustrating an example operation of the information processing apparatus when an object is recognized as the detection object and when evaluation of the imaging object is executed as processing according to the imaging object.

FIG. 13 is a flowchart illustrating an example operation of the information processing apparatus 10 when an object is recognized as a detection object and when evaluation of the imaging object is executed as the processing according to the imaging object. The example operation illustrated in FIG. 13 is only an example of the operation of the information processing apparatus 10 and it is needless to say that the operation of the information processing apparatus 10 is not limited to the example operation illustrated in FIG. 13.

First, in the information processing apparatus 10, S11 to S15 are executed similarly to the above. When the display control unit 113 determines the imaging object according to the detection object, the data obtaining unit 112 obtains the dictionary data of the determined imaging object and evaluation data according to the imaging object (S21). When the imaging object recognition unit 114 recognizes the imaging object from the captured image (S17), the processing unit 115 evaluates the imaging object by collation between the evaluation data obtained by the data obtaining unit 112 and the feature amount extracted from the imaging object (S22).

The example operation of the information processing apparatus 10 when the object is recognized as the detection object and when the evaluation of the imaging object is executed as the processing according to the imaging object is described above. In the above, the case in which the detection object is the object recognized from the captured image captured by the imaging unit 120 is mainly described, but the detection object may be, as described above, the position information of the user Ua holding the imaging unit 120.

Figure 14:
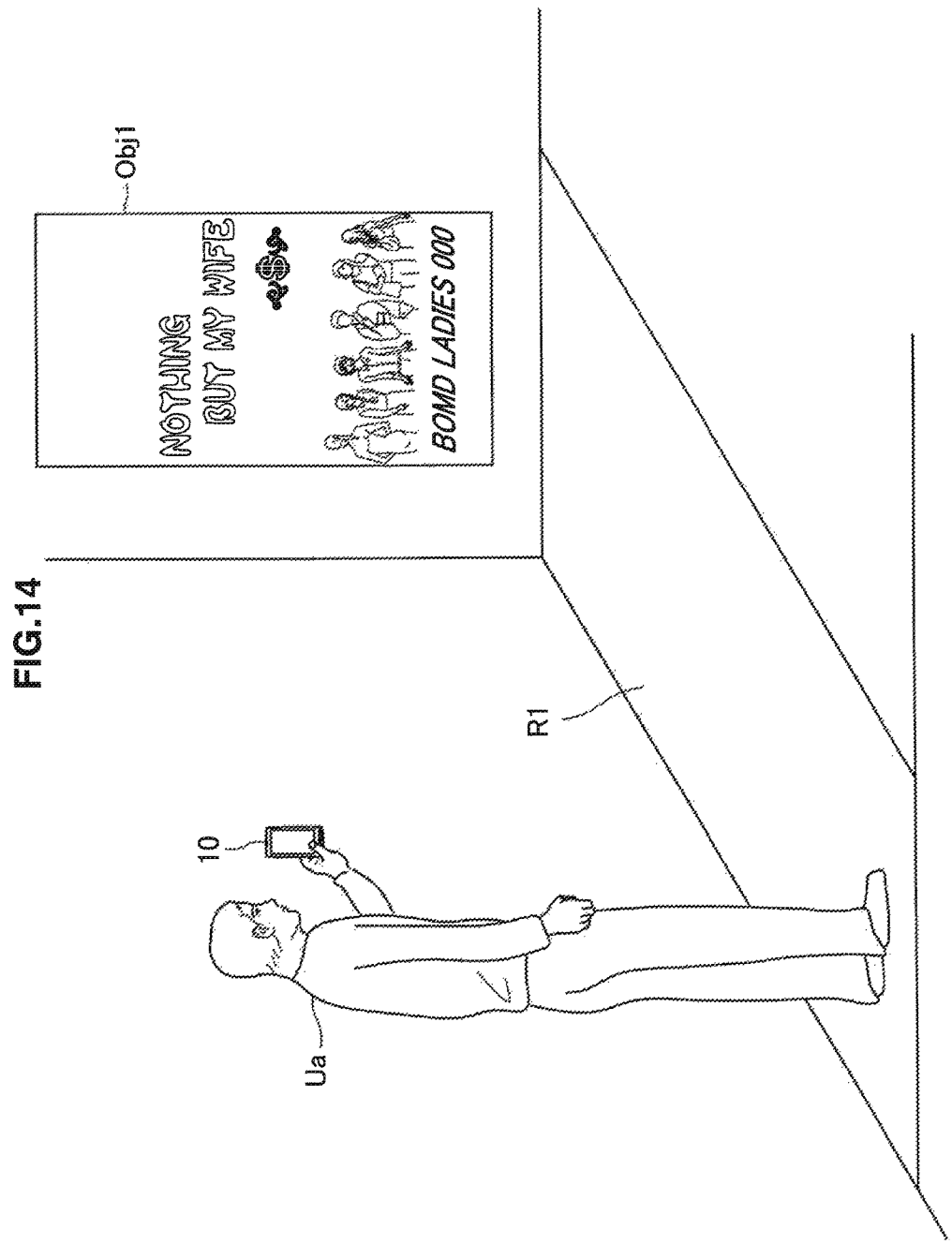
FIG. 14 is a view for explaining an example in which position information of a user is recognized as the detection object.

A case in which the detection object is the position information of the user Ua holding the imaging unit 120 will be described below. FIG. 14 is a view for explaining the example in which the position information of the user is recognized as the detection object. As illustrated in FIG. 14, the object Obj1 is present in a real space. For example, assume that the user Ua approaches the object Obj1 in order to view the object Obj1 and reaches a position R1 close to the object Obj1. However, the position R1 does not have to be close to the object Obj1 and is not particularly limited.

In the information processing apparatus 10, the detection unit 111 provides predetermined sensor data to the information provision apparatus 20. In the information provision apparatus 20, the data obtaining unit 211 obtains sensor data provided from the information processing apparatus 10, and the detection object recognition unit 212 recognizes the position information of the user Ua on the basis of the sensor data. The recognition result provision unit 213 provides the position information of the user Ua to the information processing apparatus 10. Recognition of the position information of the user Ua may be performed by the information processing apparatus 10 instead of the information provision apparatus 20.

As a method of recognizing the position information of the user Ua, various methods can be employed. For example, the detection object recognition unit 212 may specify position information of a base station connected to the information processing apparatus 10 as the position information of the user Ua. Alternatively, the detection object recognition unit 212 may recognize the position information of the user Ua on the basis of receiving intensity in the information processing apparatus 10 of a wireless signal transmitted from the base station and the position information of the base station. For example, the detection object recognition unit 212 may calculate a distance according to the receiving intensity and recognize a position away from the position of the base station by the distance as a position of the user Ua.

If there is a plurality of base stations transmitting wireless signals to the information processing apparatus 10, the detection object recognition unit 212 may recognize the position information of the user Ua on the basis of the position information of each of the plurality of base stations. For example, the detection object recognition unit 212 may recognize the position information of the user Ua by the principle of triangulation on the basis of the position information of each of the plurality of base stations and the receiving intensity of the wireless signal transmitted from each of the plurality of base stations in the information processing apparatus 10.

In addition, when the information processing apparatus 10 has an infrared sensor and when the position R1 is irradiated with the infrared rays, the position R1 may be recognized as the position information of the user Ua by reception of the infrared rays by the infrared sensor provided in the information processing apparatus 10. When the information processing apparatus 10 has a positioning function by a global positioning system (GPS), self-position estimation may be made by using the positioning function or when the information processing apparatus 10 has an acceleration sensor, the self-position estimation may be made by using detection data by the acceleration sensor.

The detection object recognition unit 212 may recognize the position information of the user Ua on the basis of a result of environmental recognition. As the environmental recognition, calculation according to a simultaneous localization and mapping (SLAM) method can be used. By means of the calculation according to the SLAM method, a three-dimensional structure of a real space shown on the captured image captured by the imaging unit 120 and a position and a posture of the imaging unit 120 can be dynamically recognized.

If the position information of the user Ua is recognized, the detection unit 111 detects the position information of the user Ua as the detection object. When the position information of the user Ua is detected, the control unit 110 may cause the operation mode to transition from the first mode in which the detection object is recognized to the second mode in which the imaging object is recognized.

At this time, similarly to the case in which the marker is used as the detection object or the case in which the object other than the marker is used, in order for the user Ua to be able to intuitively grasp the transition of the operation mode, the display control unit 113 may cause the display unit 170 to display the message that the operation mode is caused to transition from the first mode to the second mode.

Figure 15:
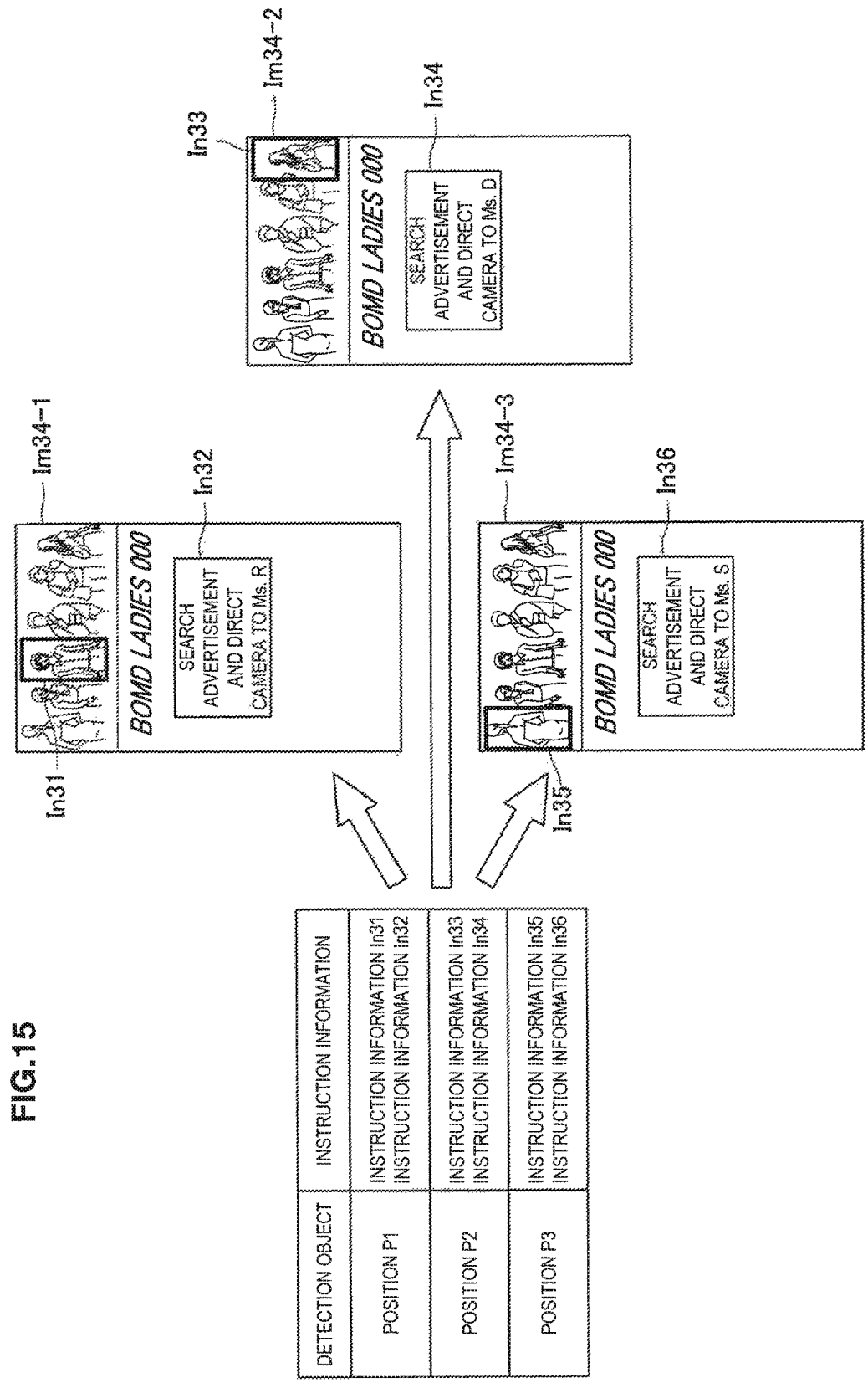
FIG. 15 is a view illustrating an example display of the instruction information according to the position information of the user.

Subsequently, the data obtaining unit 112 obtains the instruction information ordering that the imaging object according to the position information of the user Ua as the example of the detection object fall within the imaging range of the imaging unit 120, and the display control unit 113 causes the display unit 170 to display the instruction information obtained by the data obtaining unit 112. FIG. 15 is a view illustrating an example display of the instruction information according to the position information of the user Ua. As illustrated in FIG. 15, a position P1 is associated with instruction information In31 and instruction information In32, a position P2 is associated with instruction information In33 and instruction information In34, and a position P3 is associated with instruction information In35 and instruction information In36. Here, the number of pieces of instruction information associated with the position is two but it is not particularly limited.

In the example illustrated in FIG. 15, if the position P1 is detected by the detection unit 111, the data obtaining unit 112 obtains the instruction information In31 and In32 associated with the position P1. The display control unit 113 causes the display unit 170 to display a screen Im34-1 containing the instruction information In31 and In32 obtained by the data obtaining unit 112. By referring to FIG. 15, the instruction information In31 is illustrated as a rectangular frame surrounding Ms. R present on the screen Im34-1. The instruction information In32 is illustrated as text data ordering that Ms. R present on the object Obj1 fall within the imaging range of the imaging unit 120.

If the position P2 is detected by the detection unit 111, the data obtaining unit 112 obtains the instruction information In33 and In34 associated with the position P2. The display control unit 113 causes the display unit 170 to display a screen Im34-2 containing the instruction information In33 and In34 obtained by the data obtaining unit 112. By referring to FIG. 15, the instruction information In33 is illustrated as a rectangular frame surrounding Ms. D present on the screen Im34-2. The instruction information In34 is illustrated as text data ordering that Ms. D present on the object Obj1 fall within the imaging range of the imaging unit 120.

If the position P3 is detected by the detection unit 111, the data obtaining unit 112 obtains the instruction information In35 and In36 associated with the position P3. The display control unit 113 causes the display unit 170 to display a screen Im34-3 containing the instruction information In35 and In36 obtained by the data obtaining unit 112. By referring to FIG. 15, the instruction information In35 is illustrated as a rectangular frame surrounding Ms. S present on the screen Im34-3. The instruction information In36 is illustrated as text data ordering that Ms. S present on the object Obj1 fall within the imaging range of the imaging unit 120.

Here, the case is assumed in which a display position of each of the instruction information In31 to In36 is determined, and the display control unit 113 superposes the instruction information In31 to In36 on a window in accordance with the respective display positions, but the instruction information In31 to In36 may be superposed on a captured image.

Figure 16:
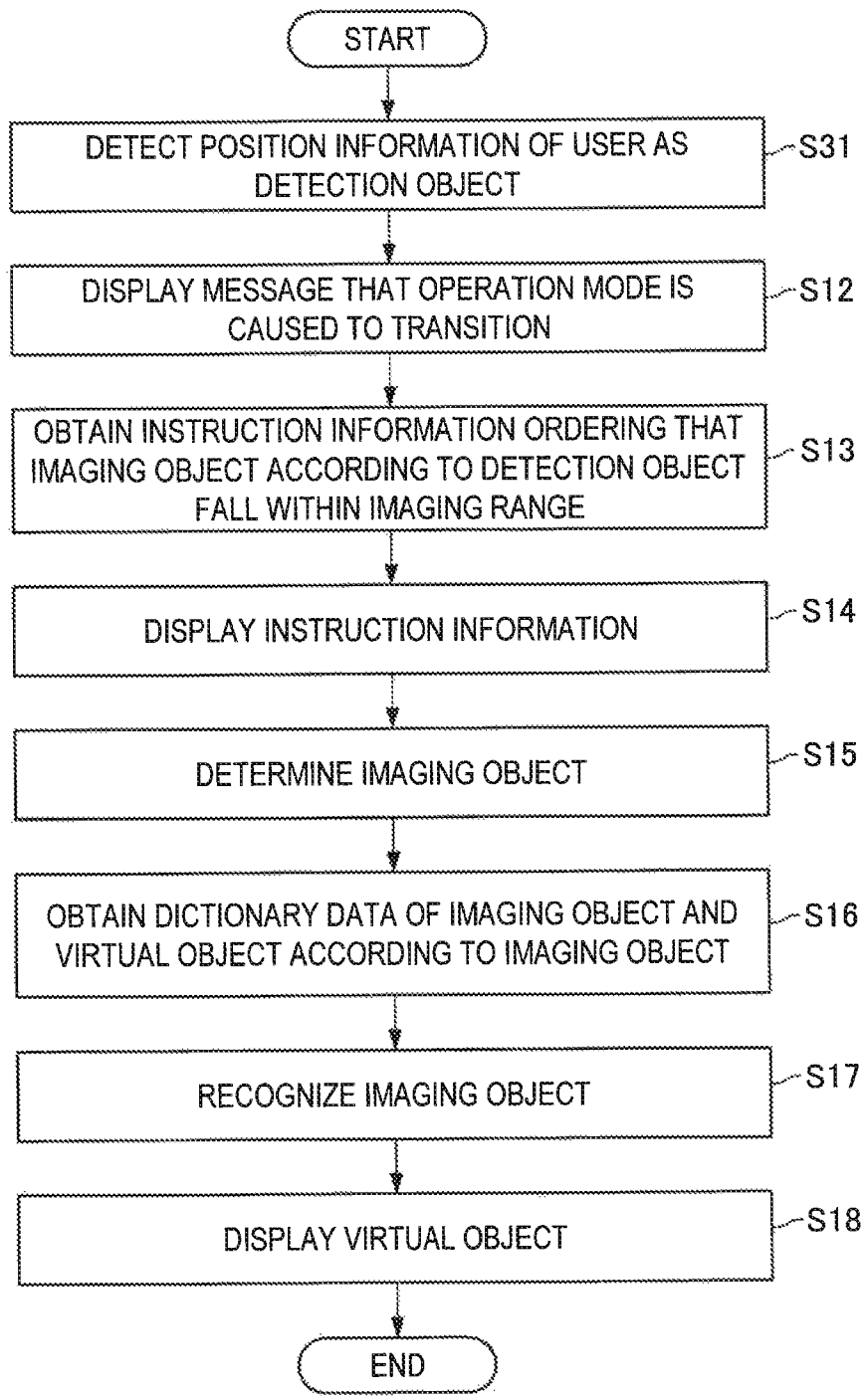
FIG. 16 is a flowchart illustrating an example operation of the information processing apparatus when the position information of the user is recognized as the detection object and when display of the virtual object is executed as processing according to the imaging object.

FIG. 16 is a flowchart illustrating an example operation of the information processing apparatus 10 when the position information of the user Ua is recognized as a detection object and when display of the virtual object is executed as the processing according to the imaging object. The example operation illustrated in FIG. 16 is only an example of the operation of the information processing apparatus and it is needless to say that the operation of the information processing apparatus is not limited to the example operation illustrated in FIG. 16.

First, in the information processing apparatus 10, the detection unit 111 determines the position information of the user Ua as a detection object (S31). Then, similarly to the above, S12 to S18 are executed. The example operation of the information processing apparatus 10 when the position information of the user Ua is recognized as a detection object and when display of the virtual object is executed as processing according to the imaging object is executed is described.

5. HARDWARE CONFIGURATION EXAMPLES

Figure 17:
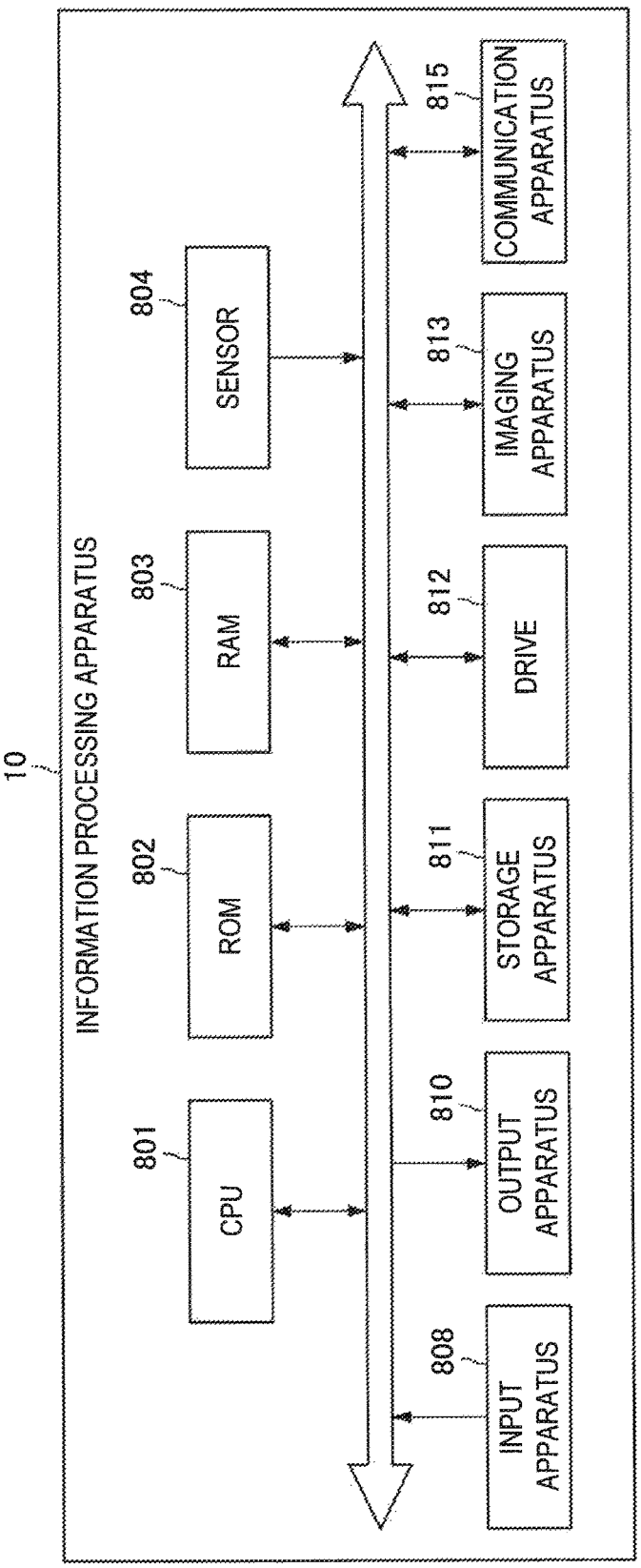
FIG. 17 is a view illustrating a hardware configuration example of the information processing apparatus.

To continue, a hardware configuration example of the information processing apparatus 10 according to an embodiment of the present disclosure will be described. FIG. 17 is a figure which shows a hardware configuration example of the information processing apparatus 10 according to an embodiment of the present disclosure. However, the hardware configuration example shown in FIG. 17 merely shows an example of the hardware configuration of the information processing apparatus 10. Therefore, the hardware configuration of the information processing apparatus 10 is not limited to the example shown in FIG. 17.

As shown in FIG. 17, the information processing apparatus 10 includes a CPU (Central Processing Unit) 801, a ROM (Read Only Memory) 802, a RAM (Random Access Memory) 803, a sensor 804, an input apparatus 808, an output apparatus 810, a storage apparatus 811, a drive 812, and a communication apparatus 815.

The CPU 801 functions as an operation processing apparatus and a control apparatus, and controls all the operations within the information processing apparatus 10 in accordance with various programs. Further, the CPU 801 may be a microprocessor. The ROM 802 stores programs and operation parameters used by the CPU 801. The RAM 803 temporarily stores programs used in the execution of the CPU 801, and parameters which arbitrarily change in this execution. These sections are mutually connected by a host bus constituted from a CPU bus or the like.

The sensor 804 is constituted from various types of detection sensors and their peripheral circuits, such as a terminal state detection sensor for detecting a state of the information processing apparatus 10. As an example, a positioning sensor, an inclination sensor, an acceleration sensor, a direction sensor, a temperature sensor, a humidity sensor, an illuminance sensor or the like can be included as the sensor 804. A detection signal by the sensor 804 is sent to the CPU 801. In this way, the CPU 801 can know the state of the information processing apparatus 10 (for example, the position, inclination, acceleration, direction, temperature, humidity, illuminance or the like).

The input apparatus 808 includes an operation unit, such as a mouse, a keyboard, a touch panel, buttons, a microphone, switches or leavers, for a user to input information, and an input control circuit which generates an input signal based on an input by the user, and outputs the input signal to the CPU 801. By operating the input apparatus 808, it is possible for the user of the information processing apparatus 10 to input various data for the information processing apparatus 10 and to order the process operations.

The output apparatus 910 includes, for example, a display device such as a liquid crystal display (LCD) apparatus, an OLED (Organic Light Emitting Diode) apparatus, or a lamp. Alternatively, the output apparatus 810 includes a sound output apparatus such as a speaker or headphones. For example, the display device may display a captured image or a generated image. On the other hand, the sound output apparatus converts sound data and outputs sounds.

The storage apparatus 811 is an apparatus for data storage constituted as an example of a storage unit of the information processing apparatus 10. The storage apparatus 811 may include a storage medium, a recording apparatus which records data to the storage medium, a reading apparatus which reads data from the storage medium, and an erasure apparatus which erases data recorded in the storage medium. This storage apparatus 811 stores programs executed by the CPU 801 and various data.

The drive 812 is a reader/writer for the storage medium, and is built into the information processing apparatus 10 or is externally attached. The drive 812 reads information recorded on a removable storage medium, such as a mounted magnetic disk, an optical disk, a magneto-optical disk, or a semiconductor memory, and outputs the information to the RAM 803. Further, the drive 812 can write information to the removable storage medium.

The imaging apparatus 813 includes an imaging optical system such as an imaging lens which collects light and a zoom lens, and a signal conversion element such as a Charge Coupled Device (CCD) or a Complementary Metal Oxide Semiconductor (CMOS). The imaging optical system collects light originating from a photographic subject and forms an image of the photographic subject in a signal conversion unit, and the signal conversion element converts the formed image of the photographic subject into an electrical image signal.

The communication apparatus 815 is, for example, a communication interface constituted by a communication device or the like for connecting to a network. Further, even if the communication apparatus 815 is a communication apparatus adaptive to wireless LAN (Local Area Network) or LTE (Long Term Evolution), the communication apparatus 815 may be a wired communication apparatus which communicates by wires. For example, it is possible for the communication apparatus 815 to communicate with other apparatuses via a network 30.

The hardware configuration examples of the information processing apparatus 10 according to an embodiment of the present disclosure have been described as above.

6. HARDWARE CONFIGURATION EXAMPLES

Figure 18:
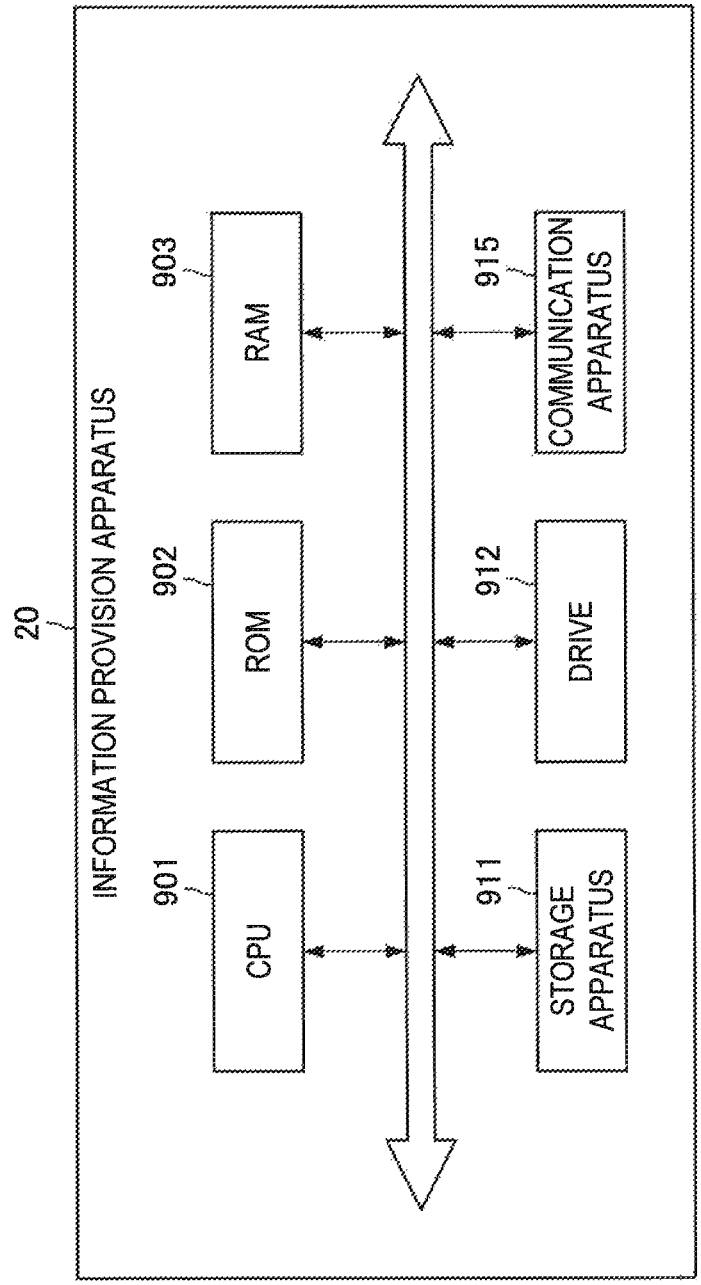
FIG. 18 is a view illustrating the hardware configuration example of the information provision apparatus.

To continue, a hardware configuration example of the information provision apparatus 20 according to an embodiment of the present disclosure will be described. FIG. 18 is a figure which shows a hardware configuration example of the information provision apparatus 20 according to an embodiment of the present disclosure. However, the hardware configuration example shown in FIG. 18 merely shows an example of the hardware configuration of the information provision apparatus 20. Therefore, the hardware configuration of the information provision apparatus 20 is not limited to the example shown in FIG. 18.

As shown in FIG. 18, the information provision apparatus 20 includes a CPU (Central Processing Unit) 901, a ROM (Read Only Memory) 902, a RAM (Random Access Memory) 903, a storage apparatus 911, a drive 912, and a communication apparatus 915.

The CPU 901 functions as an operation processing apparatus and a control apparatus, and controls all the operations within the information provision apparatus 20 in accordance with various programs. Further, the CPU 901 may be a microprocessor. The ROM 902 stores programs and operation parameters used by the CPU 901. The RAM 903 temporarily stores programs used in the execution of the CPU 901, and parameters which arbitrarily change in this execution. These sections are mutually connected by a host bus constituted from a CPU bus or the like.

The storage apparatus 911 is an apparatus for data storage constituted as an example of a storage unit of the information provision apparatus 20. The storage apparatus 911 may include a storage medium, a recording apparatus which records data to the storage medium, a reading apparatus which reads data from the storage medium, and an erasure apparatus which erases data recorded in the storage medium. This storage apparatus 911 stores programs executed by the CPU 901 and various data.

The drive 912 is a reader/writer for the storage medium, and is built into the information provision apparatus 20 or is externally attached. The drive 912 reads information recorded on a removable storage medium, such as a mounted magnetic disk, an optical disk, a magneto-optical disk, or a semiconductor memory, and outputs the information to the RAM 903. Further, the drive 912 can write information to the removable storage medium.

The communication apparatus 815 is, for example, a communication interface constituted by a communication device or the like for connecting to a network. Further, even if the communication apparatus 815 is a communication apparatus adaptive to wireless LAN (Local Area Network) or LTE (Long Term Evolution), the communication apparatus 815 may be a wired communication apparatus which communicates by wires. For example, it is possible for the communication apparatus 815 to communicate with other apparatuses via a network 30.

The hardware configuration examples of the information provision apparatus 20 according to an embodiment of the present disclosure has been described as above.

7. CONCLUSION

As described above, according to the embodiment of this disclosure, the information processing apparatus 10 is provided which includes the detection unit 111 that detects a predetermined detection object, the data obtaining unit 112 that obtains instruction information ordering that a predetermined imaging object according to the detection object fall within the imaging range of the imaging unit, and the display control unit 113 that causes the display unit 170 to display the instruction information. With such a configuration, after detection of one object, another object related to the one object can be easily recognized.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the operations of the information processing apparatus 10 do not necessarily have to be performed in a time series along the order described in the flowchart. For example, the operations of the information processing apparatus 10 may be performed in an order different from the order described in the flowchart or at least a part of the operations described in the flowchart may be performed in parallel.

Further, a program for causing hardware, such as a CPU, ROM and RAM built into a computer, to exhibit functions similar to the functions included in the above described information processing apparatus 10 can be created. Further, a recording medium can also be provided which records these programs and is capable of performing reading to the computer.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing apparatus including:

a detection unit configured to detect a predetermined detection object;

a data obtaining unit configured to obtain instruction information ordering that a predetermined imaging object according to the detection object fall within an imaging range of an imaging unit; and a display control unit configured to cause a display unit to display the instruction information.

(2)

The information processing apparatus according to (1), including:

a processing unit configured to execute processing according to the imaging object when the imaging object is recognized on the basis of a captured image captured by the imaging unit.

(3)

The information processing apparatus according to (2), including:

an imaging object recognition unit configured to recognize the imaging object from the captured image.

(4)

The information processing apparatus according to (3), wherein the data obtaining unit obtains dictionary data of the imaging object after determining the imaging object according to the detection object, and wherein the imaging object recognition unit recognizes the imaging object on the basis of collation between a feature amount extracted from the captured image and the dictionary data.

(5)

The information processing apparatus according to (4), wherein the data obtaining unit obtains a virtual object according to the imaging object when obtaining the dictionary data, and wherein the processing unit executes processing of having the virtual object displayed on the display unit when the imaging object is recognized on the basis of the captured image.

(6)

The information processing apparatus according to any one of (1) to (5), wherein the detection unit detects, as the detection object, an object recognized from the captured image captured by the imaging unit.

(7)

The information processing apparatus according to (6), including:

a control unit configured to cause an operation mode to transition from a first mode in which the detection object is recognized to a second mode in which the imaging object is recognized.

(8)

The information processing apparatus according to (7), wherein in the first mode, a marker is recognized as the detection object and in the second mode, an object is recognized as the imaging object (9)

The information processing apparatus according to (7) or (8), wherein the display control unit causes the display unit to display a message that the operation mode is caused to transition from the first mode to the second mode.

(10)

The information processing apparatus according to any one of (1) to (5), wherein the detection unit detects position information of a user holding the imaging unit as the detection object.

(11)

The information processing apparatus according to any one of (1) to (5), wherein the detection unit detects a combination of an object recognized from a captured image captured by the imaging unit and position information of a user holding the imaging unit as the detection object.

(12)

An information processing method including:

detecting a predetermined detection object;

obtaining instruction information ordering that a predetermined imaging object according to the detection object fall within an imaging range of an imaging unit; and causing, by a processor, a display unit to display the instruction information.

(13)

An information processing system including:

an information provision apparatus including a detection object recognition unit configured to recognize a predetermined detection object; and an information processing apparatus including a detection unit configured to detect the detection object, a data obtaining unit configured to obtain instruction information ordering that a predetermined imaging object according to the detection object fall within an imaging range of an imaging unit, and a display control unit configured to cause a display unit to display the instruction information.

REFERENCE SIGNS LIST 1 information processing system
10 information processing apparatus
20 information provision apparatus
30 network
110 control unit
111 detection unit
112 data obtaining unit
113 display control unit
114 imaging object recognition unit
115 processing unit
120 imaging unit
130 sensor unit
140 input unit
150 storage unit
160 communication unit
170 display unit
210 control unit
211 data obtaining unit
212 detection object recognition unit
213 recognition result provision unit
220 storage unit
230 communication unit

The invention claimed is:

1. An information processing apparatus comprising:
a detection unit configured to detect a predetermined detection object;
a data obtaining unit configured to obtain instruction information associated with the predetermined detection object, the instruction information ordering that an imaging unit should be adjusted such that a predetermined imaging object associated with the instruction information is positioned within an imaging range of the imaging unit; and
a display control unit configured to cause a display unit to display the instruction information,
wherein the detection unit, the data obtaining unit, and the display control unit are each implemented via at least one processor.

2. The information processing apparatus according to claim 1, further comprising:
a processing unit configured to execute processing according to the predetermined imaging object when the predetermined imaging object is recognized from a captured image captured by the imaging unit,
wherein the processing unit is implemented via at least one processor.

3. The information processing apparatus according to claim 2, further comprising:
an imaging object recognition unit configured to recognize the predetermined imaging object from the captured image,
wherein the imaging object recognition unit is implemented via at least one processor.

4. The information processing apparatus according to claim 3,
wherein the data obtaining unit obtains dictionary data of the predetermined imaging object after determining the predetermined imaging object according to the predetermined detection object, and
wherein the imaging object recognition unit recognizes the predetermined imaging object on the basis of collation between a feature amount extracted from the captured image and the dictionary data.

5. The information processing apparatus according to claim 4,
wherein the data obtaining unit obtains a virtual object associated with the predetermined imaging object when obtaining the dictionary data, and
wherein the processing unit executes processing of having the virtual object displayed on the display unit when the predetermined imaging object is recognized from the captured image.

6. The information processing apparatus according to claim 5,
wherein the detection unit detects, as the predetermined detection object, an object recognized from the captured image captured by the imaging unit.

7. The information processing apparatus according to claim 6, further comprising:
a control unit configured to cause an operation mode to transition from a first mode in which the predetermined detection object is recognized to a second mode in which the predetermined imaging object is recognized,
wherein the control unit is implemented via at least one processor.

8. The information processing apparatus according to claim 7,
wherein in the first mode, a marker is recognized as the predetermined detection object and in the second mode, an object is recognized as the predetermined imaging object.

9. The information processing apparatus according to claim 7,
wherein the display control unit causes the display unit to display a message that the operation mode is caused to transition from the first mode to the second mode.

10. The information processing apparatus according to claim 1,
wherein the detection unit detects position information of a user holding the imaging unit as the predetermined detection object.

11. The information processing apparatus according to claim 1,
wherein the detection unit detects a combination of an object recognized from a captured image captured by the imaging unit and position information of a user holding the imaging unit as the predetermined detection object.

12. An information processing method comprising:
detecting a predetermined detection object;
obtaining instruction information associated with the predetermined detection object, the instruction information ordering that an imaging unit should be adjusted such that a predetermined imaging object associated with instruction information is positioned within an imaging range of the imaging unit; and
causing, by a processor, a display unit to display the instruction information.

13. An information processing system comprising:
an information provision apparatus including
a detection object recognition unit configured to recognize a predetermined detection object,
wherein the detection object recognition unit is implemented via at least one processor; and
an information processing apparatus including
a detection unit configured to detect the predetermined detection object,
a data obtaining unit configured to obtain instruction information associated with the predetermined detection object, the instruction information ordering that an imaging unit should be adjusted such that a predetermined imaging object associated with the instruction information is positioned within an imaging range of an imaging unit, and
a display control unit configured to cause a display unit to display the instruction information,
wherein the detection unit, the data obtaining unit, and the display control unit are each implemented via at least one processor.

14. The information processing apparatus according to claim 1, wherein the instruction information comprises a frame surrounding the predetermined imaging object.

15. The information processing apparatus according to claim 1, wherein the display control unit is further configured to cause the display unit to display a virtual object associated with the predetermined imaging object.

16. The information processing apparatus according to claim 2, wherein the display control unit is further configured to:
adjust a position and a posture of the instruction information in accordance with a a position and a posture of the predetermined detection object; and
superpose the instruction information, in accordance with the position and the posture of the predetermined detection object, on the captured image.

* * * * *